United States Patent
Sharma et al.

(10) Patent No.: US 11,416,884 B2
(45) Date of Patent: Aug. 16, 2022

(54) PERSONALITY TRAIT-BASED CUSTOMER BEHAVIOR PREDICTION

(71) Applicant: ACCENTURE GLOBAL SOLUTIONS LIMITED, Dublin (IE)

(72) Inventors: Sanjay Sharma, New Delhi (IN);
Nilesh Kumar Gupta, New Delhi (IN);
Madhuleena Adhikary, Kolkata (IN);
Arpendu Kumar Ganguly, Gurgaon (IN); Utkarsh Mittal, Ghaziabad (IN);
Samik Adhikary, Frankfurt (DE);
Amitava Dey, New Delhi (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 0 days.

(21) Appl. No.: 16/925,024

(22) Filed: Jul. 9, 2020

(65) Prior Publication Data
US 2022/0012763 A1    Jan. 13, 2022

(51) Int. Cl.
*G06Q 30/02* (2012.01)
*G06N 20/00* (2019.01)
*G06N 3/04* (2006.01)

(52) U.S. Cl.
CPC ........... *G06Q 30/0224* (2013.01); *G06N 3/04* (2013.01); *G06N 20/00* (2019.01); *G06Q 30/0201* (2013.01); *G06Q 30/0204* (2013.01)

(58) Field of Classification Search
CPC ........... G06Q 30/0224; G06Q 30/0204; G06Q 30/0201; G06N 3/04; G06N 20/00

USPC .............................................. 705/7.29, 14.25
See application file for complete search history.

(56) References Cited

U.S. PATENT DOCUMENTS

2015/0006243 A1* 1/2015 Yuasa ................ G06Q 30/0201
705/7.29

FOREIGN PATENT DOCUMENTS

WO  WO-2008057288 A2 *  5/2008  ........... G06F 16/148

OTHER PUBLICATIONS

Sandra C. Matz, A personality test for ads, 2019 (Year: 2019).*

* cited by examiner

*Primary Examiner* — Tarek Elchanti
(74) *Attorney, Agent, or Firm* — Mannava & Kang, P.C.

(57) ABSTRACT

In some examples, personality trait-based customer behavior prediction may include extracting personality features from images associated with a user. Social style features may be extracted from social data associated with the user. Consumer demographics features may be extracted from consumer demographics data associated with the user. Based on a probability analysis of the extracted features, relevant features may be selected from the images, the social data, and the consumer demographics data. Historical purchase features may be extracted from historical purchase data associated with the user. At least one machine learning model may be trained based on the extracted features, and used to generate a next best offer for the user for purchase of a product or a service. A purchase of the product or the service may be performed based on the generated offer.

15 Claims, 19 Drawing Sheets

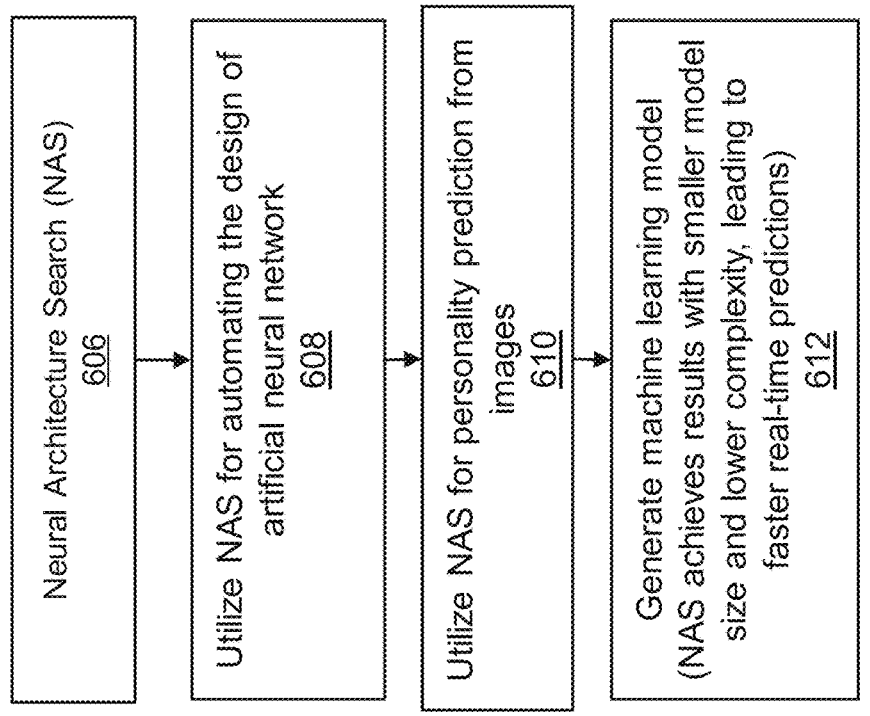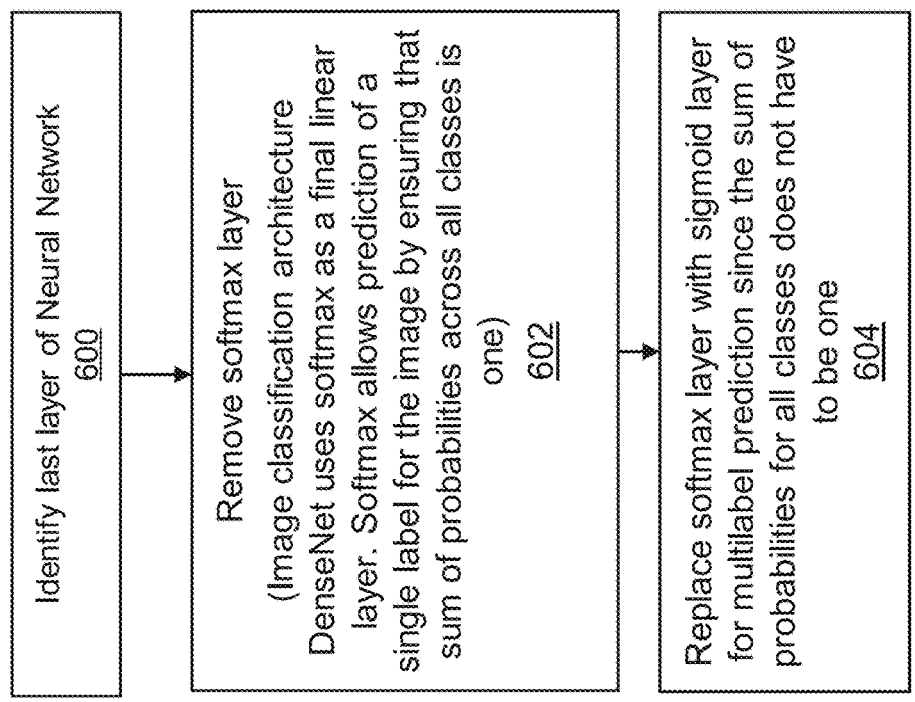
FIG. 6

1400

EXTRACT A PLURALITY OF PERSONALITY FEATURES FROM IMAGES ASSOCIATED WITH A USER
1402

EXTRACT A PLURALITY OF SOCIAL STYLE FEATURES FROM SOCIAL DATA ASSOCIATED WITH THE USER
1404

EXTRACT A PLURALITY OF CONSUMER DEMOGRAPHICS FEATURES FROM CONSUMER DEMOGRAPHICS DATA ASSOCIATED WITH THE USER
1406

SELECT, BASED ON A PROBABILITY ANALYSIS ASSOCIATED WITH THE EXTRACTED PERSONALITY FEATURES, THE EXTRACTED SOCIAL STYLE FEATURES, AND THE EXTRACTED CONSUMER DEMOGRAPHICS FEATURES, RELEVANT FEATURES FROM THE IMAGES, THE SOCIAL DATA, AND THE CONSUMER DEMOGRAPHICS DATA
1408

EXTRACT A PLURALITY OF HISTORICAL PURCHASE FEATURES FROM HISTORICAL PURCHASE DATA ASSOCIATED WITH THE USER
1410

```
TRAIN, BASED ON THE RELEVANT FEATURES SELECTED FROM THE
IMAGES, THE SOCIAL DATA, AND THE CONSUMER DEMOGRAPHICS
DATA, AND THE EXTRACTED HISTORICAL PURCHASE FEATURES, AT
LEAST ONE MACHINE LEARNING MODEL
1412
```

```
GENERATE, BY USING THE AT LEAST ONE TRAINED MACHINE
LEARNING MODEL, A NEXT BEST OFFER FOR THE USER FOR
PURCHASE OF A PRODUCT OR A SERVICE
1414
```

```
PERFORM, BASED ON THE GENERATED OFFER FOR THE USER FOR
PURCHASE OF THE PRODUCT OR THE SERVICE, A PURCHASE OF THE
PRODUCT OR THE SERVICE
1416
```

*FIG. 14 (CONT.)*

PERSONALITY TRAIT-BASED CUSTOMER BEHAVIOR PREDICTION

BACKGROUND

A user, such as a customer, may access a website to purchase a product or a service. The website may track the user's purchases. These purchases may be included in the user's purchasing history, which may be analyzed to recommend additional products or services that may be purchased by the user.

BRIEF DESCRIPTION OF DRAWINGS

Features of the present disclosure are illustrated by way of example and not limited in the following figure(s), in which like numerals indicate like elements, in which:

FIG. 6 illustrates further details of the deep learning process flow of FIG. 5 to illustrate operation of the personality trait-based customer behavior prediction apparatus of FIG. 1 in accordance with an example of the present disclosure;

FIG. 14 illustrates a flowchart of an example method for personality trait-based customer behavior prediction in accordance with an example of the present disclosure.

DETAILED DESCRIPTION

Figure 1:
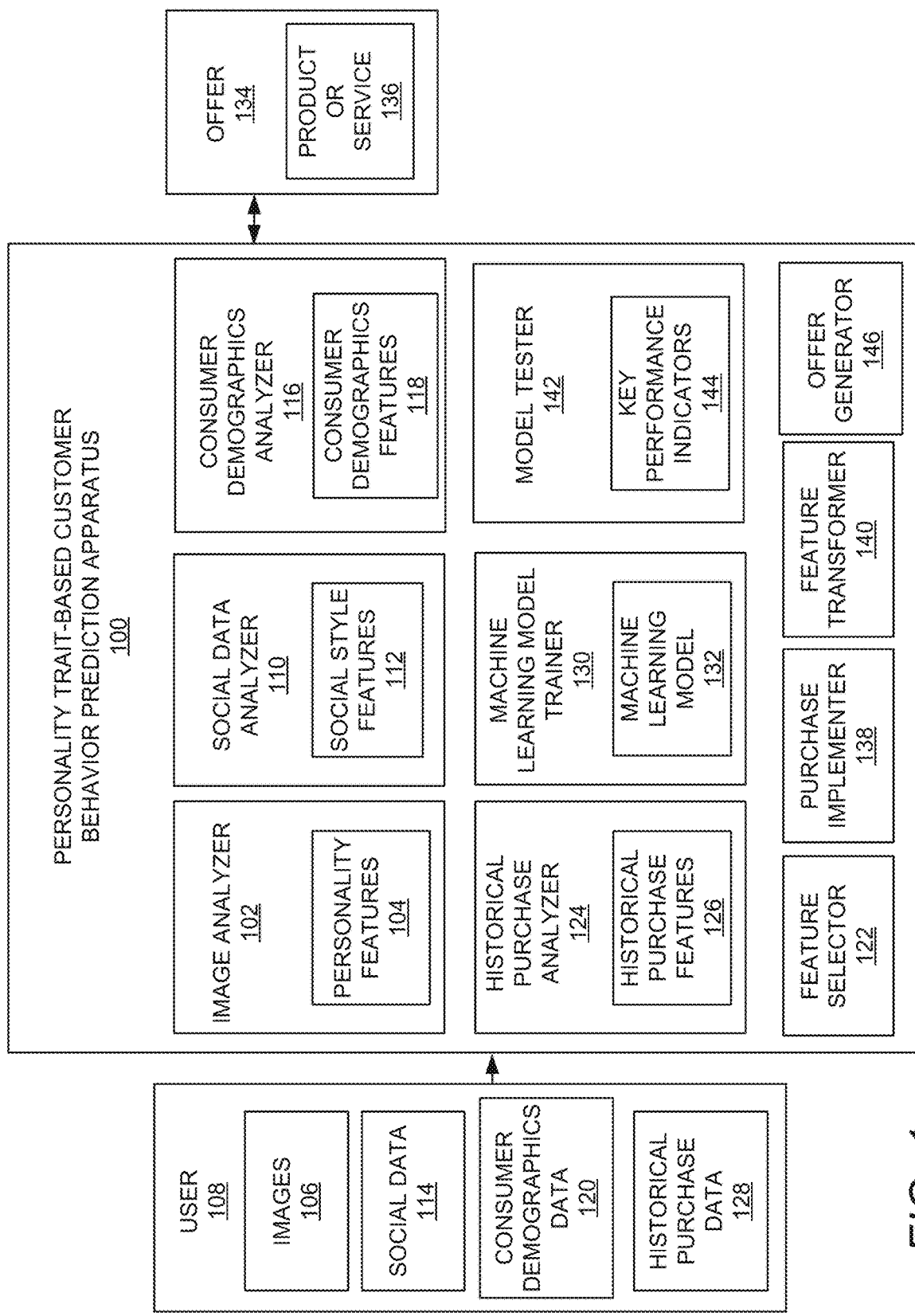
FIG. 1 illustrates a layout of a personality trait-based customer behavior prediction apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Personality trait-based customer behavior prediction apparatuses, methods for personality trait-based customer behavior prediction, and non-transitory computer readable media having stored thereon machine readable instructions to provide recommendations for offers that are personalized to a user are disclosed herein. In this regard, the user may include, for example, a customer, and any other entity (e.g., an organization, a group, etc.), for whom a recommendation for purchase of a product or a service may be made as disclosed herein. The apparatuses, methods, and non-transitory computer readable media disclosed herein may analyze a user's personality traits from image and social media feeds, and combine the personality traits with demographics and purchasing trends to determine insights on recommendations. The apparatuses, methods, and non-transitory computer readable media disclosed herein may provide for utilization of the recommendations, for example, to predict best offers, churn rates, and other metrics that may be relevant to an industry. Further, the apparatuses, methods, and non-transitory computer readable media disclosed herein may implement a probability analysis to select the best features, which thus provides a higher convergence accuracy.

With respect to purchase of products and/or services, as disclosed herein, a user, such as a customer, may access a website to purchase a product or a service. The website may track the user's purchases. These purchases may be included in the user's purchasing history, which may be analyzed to recommend additional products or services that may be purchased by the user. Other factors that may contribute to a user's decision to purchase a product or service may include personality factors, social style factors, and demographic factors. For example, the personality factors may be related to a user's personality features such as excited, happy, calm, sad, etc. The social style factors may be related to the user's social style features such as sympathetic, critical, impulsive, etc. Yet further, the demographic factors may be related to the user's demographic features such as hotel stay information, travel accessory purchases, modes of transportation utilized, etc. In this regard, it is technically challenging to objectively and automatically (e.g., without human intervention) combine such personality factors, social style factors, and demographic factors with a user's purchasing history to accurately generate a next best offer for purchase of a product or a service. Yet further, it is technically challenging to implement the generated offer to perform the purchase of the product or the service.

The apparatuses, methods, and non-transitory computer readable media disclosed herein overcome at least the aforementioned technical challenges by implementing a machine learning approach to quantify a user's psychometric traits by extracting personality features from images to analyze facial expressions. The extracted personality features may be scored. In addition to the extracted personality features, the user's digital footprints may be analyzed and scored. For example, social style features from social data, and consumer demographics features from consumer demographics data associated with the user may be scored. The user's quantified traits based on the analyzed personality features, social style features, and consumer demographic features may be combined with historical purchase features associated with the user to train one or more machine learning models. The machine learning model may be utilized to generate a next best offer for the user for purchase of a product or a service. Yet further, based on the generated offer for the user for purchase of the product or service, the apparatuses, methods, and non-transitory computer readable media disclosed herein may automatically (e.g., without human intervention) implement the performance of the generated offer to purchase the product or the service.

For the apparatuses, methods, and non-transitory computer readable media disclosed herein, dense convolutional network (DenseNet) may represent a specific type of convolutional neural network (CNN) in which each layer is connected to every other layer (as opposed to where each layer being connected to only the layer just preceding it). Dense convolutional network may solve the drawbacks related to vanishing-gradients, and utilize relatively less computation to achieve (relatively) increased performance.

For the apparatuses, methods, and non-transitory computer readable media disclosed herein, an image prediction problem may be modeled as single-label classification (e.g., image may belong to only one of the classes in the output) or multi-label classification (e.g., single image instance may belong to multiple classes at the same time). The classes may refer to the target/dependent variables which are predicted by the machine learning model as disclosed herein. For example, classes may be confident, fearful, anxious, and influencer (e.g., as disclosed herein with respect to FIG. 4). A detailed example of single-label versus multi-label classification and corresponding class predictions is also disclosed herein. In this regard, the dense convolutional network may be implemented as disclosed herein with a last layer as softmax for single-label classification, and the dense convolutional network may be implemented with a last layer as sigmoid for multi-label classification.

For the apparatuses, methods, and non-transitory computer readable media disclosed herein, with respect to prediction of personality traits using images, the dense convolutional network may be utilized for multi-label classification as disclosed herein. The prediction of multi-label classification may provide for tagging of several personality traits to the same image (e.g., the same image can depict, for example, personality features). In this regard, the apparatuses, methods, and non-transitory computer readable media disclosed herein may utilize an exhaustive set of potential personality traits (e.g., ten or more personality traits as opposed to, for example, five personality traits). Thereafter the dense convolutional network may be utilized with a last layer as sigmoid, to predict multiple personality traits of a person (e.g., from the exhaustive list) using the image stack. These multiple traits may then flow into the probabilistic approach to combine features as disclosed herein.

For the apparatuses, methods, and non-transitory computer readable media disclosed herein, even though the dense convolutional network may represent a particular type of convolutional neural network with extensive intra-layer connections, the dense convolutional network may be implemented in various forms by varying the number of such layers and the number of dense-blocks in the network. Apart from this, hyperparameters such as learning rate, may further add to the various possibilities of dense convolutional network implementations.

For the apparatuses, methods, and non-transitory computer readable media disclosed herein, a neural architecture search (NAS) strategy as disclosed herein may be utilized to determine an optimal architecture on a small dataset and then transfer the architecture to the larger dataset. The presence of dense connections in the internal structure of the dense convolutional network, though useful for building more accurate models, may lead to high computational cost. In this regard, a layer-wise pruning search strategy may be applied within the neural architecture search to find an optimal—accurate, yet less-complex architecture without sacrificing the original advantage of the dense convolutional network of efficient feature reuse.

The apparatuses, methods, and non-transitory computer readable media disclosed herein may thus provide for implementation of an integrated pipeline consisting of components such as an extensive list of traits, usage of the dense convolutional network with a last layer sigmoid to predict multiple personality traits from images, and implementation of a neural architecture search (NAS) strategy to determine an optimal yet fast architecture.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example personality trait-based customer behavior prediction apparatus (hereinafter also referred to as "apparatus 100").

Referring to FIG. 1, the apparatus 100 may include an image analyzer 102 that is executed by at least one hardware processor (e.g., the hardware processor 1302 of FIG. 13, and/or the hardware processor 1504 of FIG. 15) to extract a plurality of personality features 104 from images 106 associated with a user 108. The image analyzer 102 may determine, for the extracted personality features 104, a weighted distribution of the extracted personality features 104.

A social data analyzer 110 that is executed by at least one hardware processor (e.g., the hardware processor 1302 of FIG. 13, and/or the hardware processor 1504 of FIG. 15) may extract a plurality of social style features 112 from social data 114 associated with the user 108. The social data analyzer 110 may determine, for the extracted social style features 112, a weighted distribution of the extracted social style features 112.

A consumer demographics analyzer 116 that is executed by at least one hardware processor (e.g., the hardware processor 1302 of FIG. 13, and/or the hardware processor 1504 of FIG. 15) may extract a plurality of consumer demographics features 118 from consumer demographics data 120 associated with the user 108.

A feature selector 122 that is executed by at least one hardware processor (e.g., the hardware processor 1302 of FIG. 13, and/or the hardware processor 1504 of FIG. 15) may select, based on a probability analysis associated with the weighted distribution of the extracted personality features 104, the weighted distribution of the extracted social style features 112, and the extracted consumer demographics features 118, relevant features from the images 106, the social data 114, and the consumer demographics data 120. Thus, the relevant features may be selected from a predefined pool of feature sets. Each predefined feature set from the images 106, the social data 114, and the consumer demographics data 120 may follow a fitted probability distribution with defined moments. The distribution may be discreet in the case of binary features and continuous in the case of purchasing patterns. In the event that the individual features do not reject the Null hypothesis of belonging to the fitted distribution, the individual distribution may be selected for analysis.

A historical purchase analyzer 124 that is executed by at least one hardware processor (e.g., the hardware processor 1302 of FIG. 13, and/or the hardware processor 1504 of FIG. 15) may extract a plurality of historical purchase features 126 from historical purchase data 128 associated with the user 108. The historical purchase analyzer 124 may identify a plurality of best fit historical purchase features from the plurality of extracted historical purchase features 126.

A machine learning model trainer 130 that is executed by at least one hardware processor (e.g., the hardware processor 1302 of FIG. 13, and/or the hardware processor 1504 of FIG. 15) may train, based on the relevant features selected from the images 106, the social data 114, and the consumer demographics data 120, and the best fit historical purchase features, at least one machine learning model 132.

An offer generator 146 that is executed by at least one hardware processor (e.g., the hardware processor 1302 of FIG. 13, and/or the hardware processor 1504 of FIG. 15) may generate, by using the at least one trained machine learning model 132, a next best offer 134 for the user 108 for purchase of a product or a service 136.

A purchase implementer 138 that is executed by at least one hardware processor (e.g., the hardware processor 1302 of FIG. 13, and/or the hardware processor 1504 of FIG. 15) may perform, based on the generated offer 134 for the user 108 for purchase of the product or the service 136, a purchase of the product or the service 136. In this regard, the purchase implementer 138 may determine buying patterns of the user 108 based on the historical purchase data 128. The relevant features of purchase may include instances such as frequency, basket size (e.g., cart size for holding a product or service to be purchased), basket depth, interval of purchase, channels through which purchase is made (e.g., in-store, online, etc.), offers selected, purchased with or without discount, etc. These pools of features may then be analyzed along with the image recognition and social style features to generate relevant offers to the user 108 as disclosed herein. The user 108 may have a pre-specified preference to automatically (e.g., without human intervention) implement the offer 134. For example, once the offer 134 is provided to the user 108, the user 108 may have a preference that specifies that after a specified period of time (e.g., 15 minutes), the offer 134 is automatically implemented to purchase the product or service 136. In this regard, the user's pre-entered account details may be utilized to automatically implement the purchase of the product or service 136. The pre-specified time may allow the user an opportunity to indicate whether to allow or prevent (e.g., cancel) the purchase from being completed.

A feature transformer 140 that is executed by at least one hardware processor (e.g., the hardware processor 1302 of FIG. 13, and/or the hardware processor 1504 of FIG. 15) may transform a feature set that includes the weighted distribution of the extracted personality features and the weighted distribution of the extracted social style features to generate additional features. In this regard, when the individual feature sets are determined from the images 106, the social data 114, and the consumer demographics data 120, there are likely to be features that are overlapping. For example, based on the social data 114, a feature may qualify an "outgoing" personality, and similar features may be extracted from images as well. The feature transformer 140 may combine these overlapping feature sets to reduce associated dimensions, and to ensure non-repetition. In other cases, additional features may be determined based on the interaction impacts such as interaction between purchase features such as "Basket Depth" and "Basket variety" that may be quantified as "BasketVolume". The feature selector 122 may select, based on the probability analysis associated with the weighted distribution of the extracted personality features 104, the weighted distribution of the extracted social style features 112, the generated additional features, and the extracted consumer demographics features 118, the relevant features from the images 106, the social data 114, and the consumer demographics data 120.

According to examples disclosed herein, the image analyzer 102 may extract the plurality of personality features 104 from images 106 associated with the user 108 by utilizing a dense convolutional network architecture that includes a sigmoid function to implement multi-label classification to extract the plurality of personality features 104. Further, the image analyzer 102 may utilize the dense convolutional network architecture and a neural architecture search to extract the plurality of personality features 104.

According to examples disclosed herein, the social data analyzer 110 may extract the plurality of social style features 112 from social data 114 associated with the user 108 by utilizing an attention based bidirectional long short-term memory model to extract the plurality of social style features 112 from social data 114 associated with the user 108. Further, the social data analyzer 110 may utilize the attention based bidirectional long short-term memory model and neural transfer learning to extract the plurality of social style features 112 from social data 114 associated with the user 108.

According to examples disclosed herein, the feature selector 122 may select, based on the probability analysis associated with the weighted distribution of the extracted personality features 104, the weighted distribution of the extracted social style features 112, and the extracted consumer demographics features 118, the relevant features from the images 106, the social data 114, and the consumer demographics data 120 by analyzing, for each feature of the extracted personality features 104, the extracted social style features 112, and the extracted consumer demographics features 118, a random variable representing the feature to test the random variable to explain a target variable. Further, the feature selector 122 may determine a pairwise correlation between the random variable and the target variable.

A model tester 142 that is executed by at least one hardware processor (e.g., the hardware processor 1302 of FIG. 13, and/or the hardware processor 1504 of FIG. 15) may test the at least one trained machine learning model 132 by selecting, based on the probability analysis, training features from the images 106, the social data 114, the consumer demographics data 120, and the historical purchase data 128. Further, the model tester 142 may utilize parameters of the at least one trained machine learning model 132 to quantify an impact of the selected training features on key performance indicators 144.

Operation of the apparatus 100 is described in further detail with reference to FIGS. 1-12.

Figure 2:
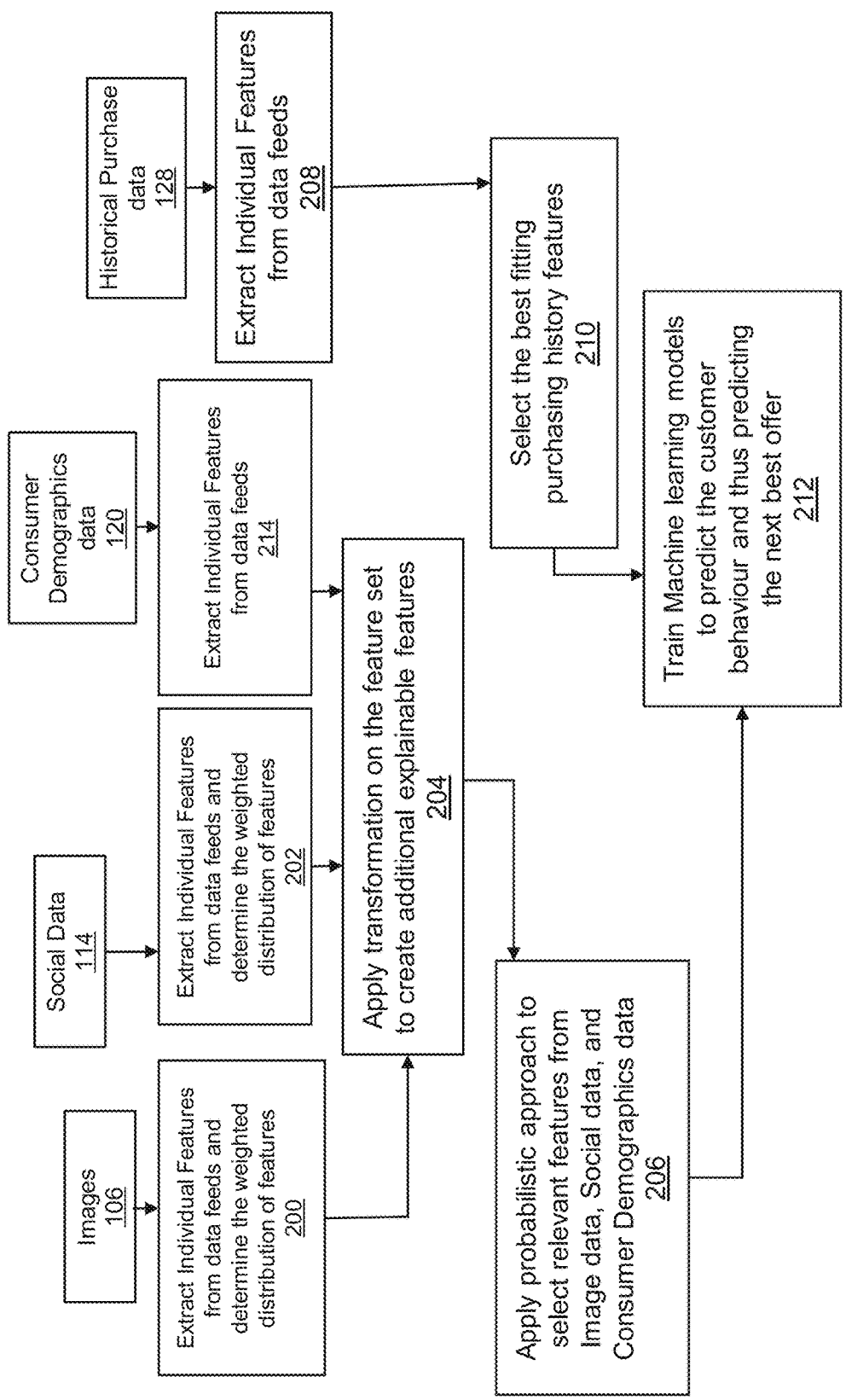
FIG. 2 illustrates a logical flow for generation of a training set to illustrate operation of the personality trait-based customer behavior prediction apparatus of FIG. 1 in accordance with an example of the present disclosure.

FIG. 2 illustrates a logical flow for generation of a training set to illustrate operation of the apparatus 100 in accordance with an example of the present disclosure.

Referring to FIG. 2, at block 200, the image analyzer 102 may extract a plurality of personality features 104 from images 106 associated with the user 108. The image analyzer 102 may determine, for the extracted personality features 104, a weighted distribution of the extracted personality features 104. The weighted distribution of the extracted personality features 104 may be particularly applicable for image based and social data based features, where the weighted distribution of the extracted personality features 104 may be determined based on the multiple images 106 and the social data 114 received for the user 108. For example, if 'n' out of 'N' total images predict that a person is anxious, this feature may be assigned a higher weight as compared to other features. This weighted distribution of features in turn may be utilized as disclosed herein for the final offer recommendation. For an example of a cosmetics web application in the cosmetics industry, the application may include features such as product purchases, skin analysis, subscription options, membership options, etc. The cosmetics web application may allow the user 108 to enter a customer profile, which may be utilized to link to other social media sites such as Facebook™, Instagram™, etc. The images 106 for the cosmetics web application example may include a profile picture of the user 108, and face analysis screenshots of the user 108. Examples of personality features that are extracted may include features such as happy, relaxed, calm, sleepy, bored, nervous, angry, depression liveliness, straightforwardness, modesty, social boldness, etc., which may be extracted based on which products can be recommended.

At block 202, the social data analyzer 110 may extract a plurality of social style features 112 from social data 114 associated with the user 108. The social data analyzer 110 may determine, for the extracted social style features 112, a weighted distribution of the extracted social style features 112. For the example of the cosmetics web application, the social data 114 may include, for example, makeup product subscriptions, followers of social media influencers, beauty blog memberships, etc. Instances of social style features may include influential, glamorous, open, self-conscious, perceiving, conventional, etc., based on the social data 114 feed such as makeup product subscriptions, followers of social media influencers, beauty blog memberships of the user, etc.

At block 214, the consumer demographics analyzer 116 may extract a plurality of consumer demographics features 118 from consumer demographics data 120 associated with the user 108. For the example of the cosmetics web application, the consumer demographics data 120 may include, for example, brand/product loyalty data. Similarly, consumer demographic features may include, for example, age, group, gender, ethnicity, socio-economic profile, etc.

At block 204, the feature transformer 140 may transform a feature set that includes the weighted distribution of the extracted personality features and the weighted distribution of the extracted social style features to generate additional features. For the example of the cosmetics web application, with respect to the additional features that may be generated, for an extracted personality feature of 'assertive' and a social style feature which points at being 'open', these features may be utilized to together generate an additional features such as 'social boldness', 'influencing', etc.

At block 206, the feature selector 122 may select, based on a probability analysis associated with the weighted distribution of the extracted personality features 104, the weighted distribution of the extracted social style features 112, and the extracted consumer demographics features 118, relevant features from the images 106, the social data 114, and the consumer demographics data 120. For the example of the cosmetics web application, examples of the relevant features that may be selected from the images 106, the social data 114, and the consumer demographics data 120 may include features such as happy, relaxed, calm, sleepy, bored, nervous, angry, depression, liveliness, straightforwardness, modesty, social boldness, etc., for the images 106, influential, glamorous, open, self-conscious, perceiving, conventional, etc., for the social data 114, and age group, gender, ethnicity, socio-economic profile, occupation, etc., for the consumer demographics data 120.

At block 208, the historical purchase analyzer 124 may extract a plurality of historical purchase features 126 from historical purchase data 128 associated with the user 108. In this regard, feature engineering may be utilized to overlay with demographics and historical purchase information. For the example of the cosmetics web application, the historical purchase data 128 may include, for example, a history of makeup products, gift certificates, etc., that have been purchased by the user 108.

At block 210, the historical purchase analyzer 124 may identify a plurality of best fitting historical purchase features from the plurality of extracted historical purchase features 126. Examples of best fitting historical purchase features may include buying pattern, basket/cart size, buying frequency, etc.

At block 212, the machine learning model trainer 130 may train, based on the relevant features selected from the images 106, the social data 114, and the consumer demographics data 120, and the best fit historical purchase features, at least one machine learning model 132. The offer generator 146 may generate, by using the at least one trained machine learning model 132, a next best offer 134 for the user 108 for purchase of a product or a service 136. For the example of the cosmetics web application, with respect to the next best offer, the offer generator 146 may provide for the up-selling or cross-selling of additional products to the user 108 based on the extraction of the images 106, the social data 114, as well as the consumer demographics data 120. For example, if a user 108 requests to buy one product (e.g., lipstick), the offer generator 146 may provide additional recommendations with suggestions on additional products (e.g., a higher version of the lipstick, or an entirely different product such as eye cream, face serum, etc.) based on the extraction of the traits from the different data types.

Figure 3:
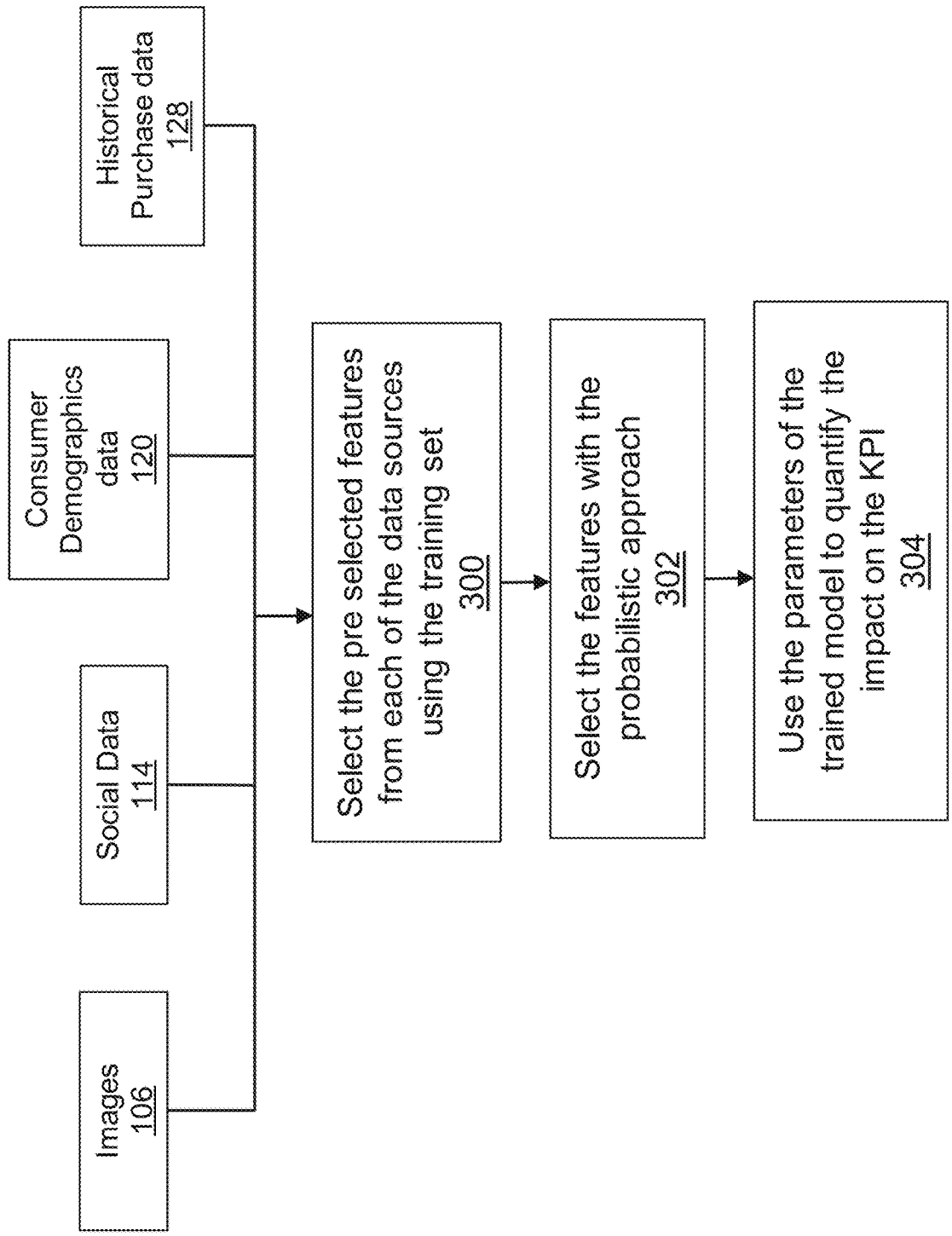
FIG. 3 illustrates a logical flow for analysis of a test set to illustrate operation of the personality trait-based customer behavior prediction apparatus of FIG. 1 in accordance with an example of the present disclosure.

FIG. 3 illustrates a logical flow for analysis of a test set to illustrate operation of the apparatus 100 in accordance with an example of the present disclosure.

Referring to FIG. 3, at 300, the model tester 142 may select the pre-selected features from the images 106, the social data 114, the consumer demographics data 120, and the historical purchase data 128 using the training feature set utilized at block 212. For the example of the cosmetics web application, pre-selected features may be a combination of features from images 106 (e.g., 'happy', 'calm, 'assertive', etc.), social data 114 (e.g., multitude of makeup product subscriptions, etc.), consumer demographics data 120 (e.g., historical gift certificates on makeup products purchased, etc.), and historical purchase data 128 (e.g., loyalty points, etc.).

At block 302, the model tester 142 may test the at least one trained machine learning model 132 by selecting, based on the probability analysis, training features from the images 106, the social data 114, the consumer demographics data 120, and the historical purchase data 128. Compared to block 302, at block 300, the feature set (e.g., the features that are finally fitted in the training set) are selected from the test set. In this regard, at block 302, a pruning layer is provided to ensure that the pre-selected features from the training set follow the fitted probability distribution of the training set. In case it does not reject the Null Hypothesis (e.g., the features follows the fitted distribution), the feature is selected.

At block 304, the model tester 142 may utilize parameters of the at least one trained machine learning model 132 to quantify an impact of the selected training features on key performance indicators 144. For the example of the cosmetics web application, examples of the parameters of trained machine learning model 132 may include the weights assigned against the key features in the machine learning model 132, which are overlaid on top of the model tester 142.

Figure 4:
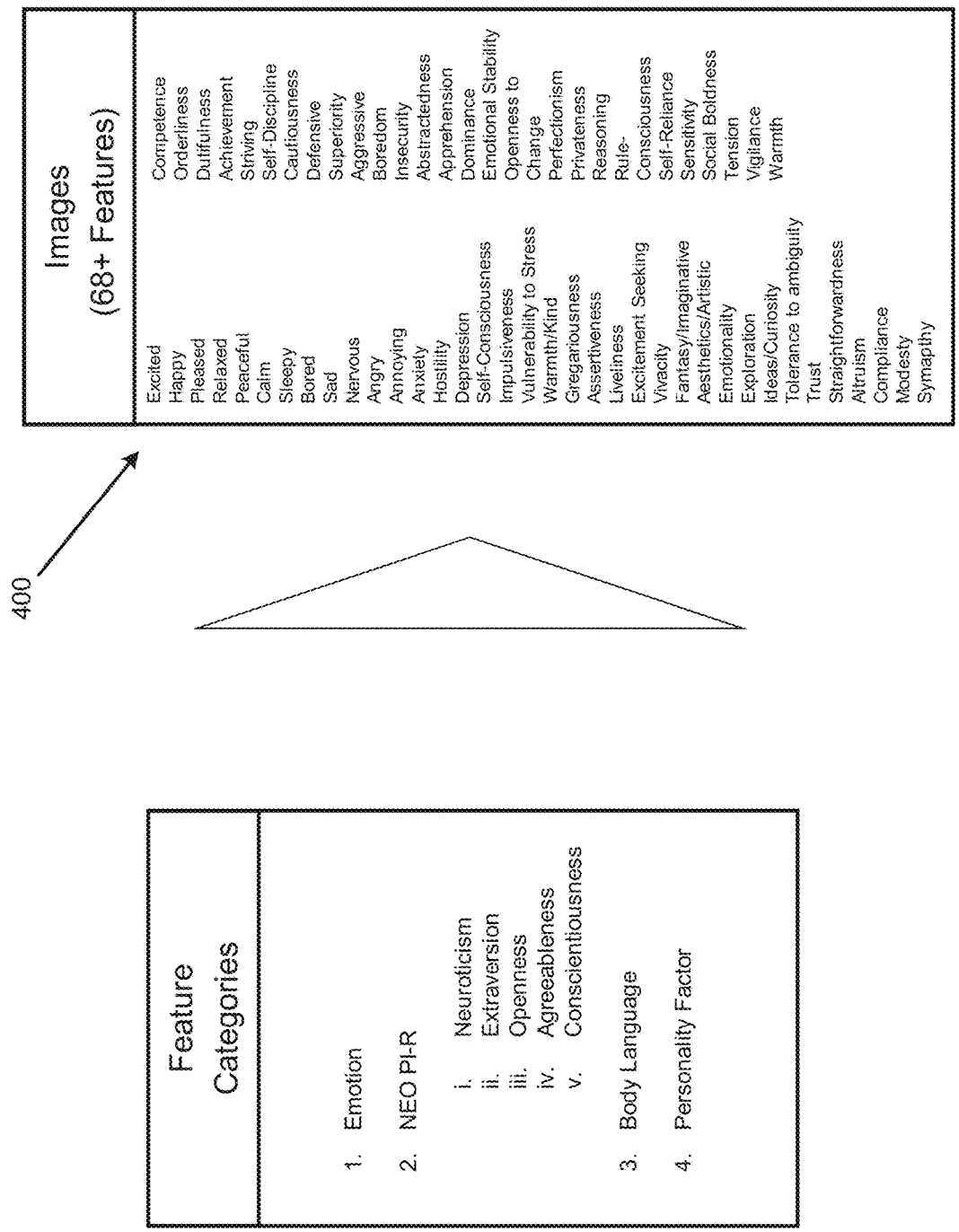
FIG. 4 illustrates personality features extracted from images to illustrate operation of the personality trait-based customer behavior prediction apparatus of FIG. 1 in accordance with an example of the present disclosure.

FIG. 4 illustrates personality features extracted from images to illustrate operation of the apparatus 100 in accordance with an example of the present disclosure.

Referring to FIG. 4, with respect to the images 106, examples of feature categories may include emotion, NEO PI-R (e.g., neuroticism, extraversion, openness, agreeableness, and conscientiousness), body language, and personality factor. In this regard, examples of personality features 104 are shown at 400, and may include features such as excited, happy, pleased, relaxed, etc.

Figure 5:
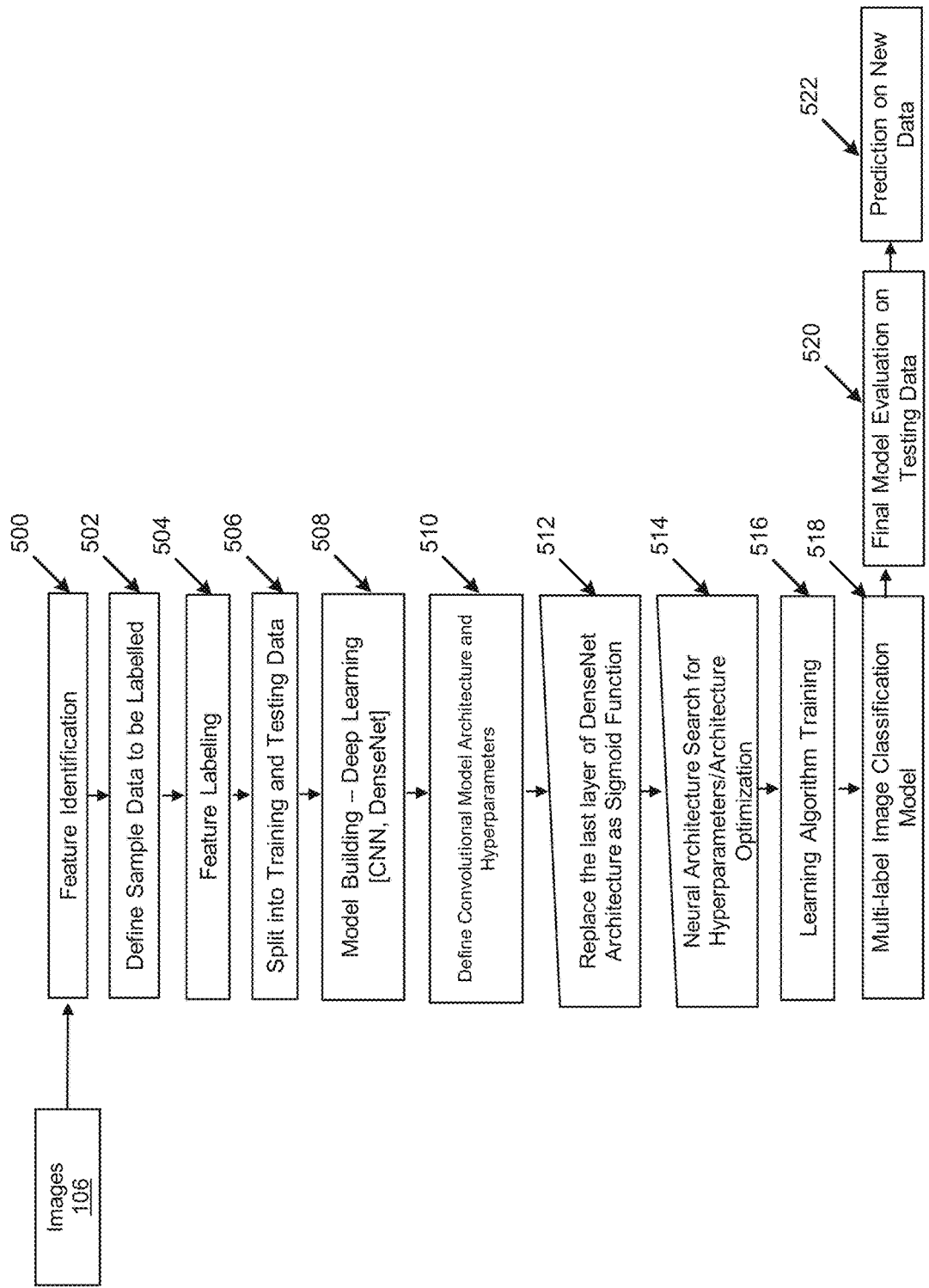
FIG. 5 illustrates a deep learning process flow with respect to personality feature extraction from images to illustrate operation of the personality trait-based customer behavior prediction apparatus of FIG. 1 in accordance with an example of the present disclosure.

FIG. 5 illustrates a deep learning process flow with respect to personality feature extraction from images to illustrate operation of the apparatus 100 in accordance with an example of the present disclosure.

Referring to FIG. 5, with respect to image extraction from the images 106, at block 500, the image analyzer 102 may perform feature identification with respect to the images 106 to extract the personality features 104.

At block 502, the image analyzer 102 may define sample data to be labelled. The sample data may be defined as a best representative of the population in question, and in this context the tag or label may be assigned to each image, for example, by utilizing data programming (e.g., using scripts to programmatically label data).

At block 504, the image analyzer 102 may perform feature labeling.

At block 506, the image analyzer 102 may divide the extracted personality features 104 into training data and testing data.

At block 508, the machine learning model trainer 130 may first build, based on the relevant features selected from the images 106, the social data 114, and the consumer demographics data 120, and the best fit historical purchase features, at least one machine learning model 132. In this regard, the at least one machine learning model 132 may be built by utilizing a dense convolutional network architecture.

At block 510, the machine learning model trainer 130 may define a convolutional model architecture and hyperparameters for the at least one machine learning model 132.

At block 512 (as described in further detail with reference to FIG. 6), for the at least one machine learning model 132, the last layer of dense convolutional network architecture may be replaced by a sigmoid function to enable multi-label classification, instead of single label classification to extract the plurality of personality features 104. This framework that predicts multi-label classification provides for the tagging of several personality traits to the same image (e.g., the image can depict, for example, ten personality features 104). In this regard, the at least one machine learning model 132 may be built by starting with an exhaustive set of potential personality traits (as opposed to a limited number (e.g., five) personality traits). Then, a dense convolutional network architecture with a last layer as a sigmoid function may be utilized to predict multiple personality traits (out of the exhaustive list) present in the image.

At block 514 (as described in further detail with reference to FIG. 6), a neural architecture search may be performed for hyperparameters and architecture optimization. In this regard, design of convolutional neural networks may be automated to determine optimal hyperparameters to thus achieve results with a relatively smaller model size and lower complexity. The presence of dense connections in the internal structure of dense convolutional network, though useful for building more accurate models, may lead to higher computational cost. In this regard, a layer-wise pruning search strategy may be applied within a neural architecture search (NAS) to determine an optimal architecture without negatively impacting efficient feature reuse for dense convolutional network. An optimal architecture may be searched for on a small dataset and then transferred to the larger dataset. A reinforcement-learning agent may traverse the search space with the following configuration of action (e.g., decision to keep or remove the $i^{th}$ layer connection), and reward (e.g., tradeoff between prediction accuracy and (float point operations) FLOPs. Thus, the neural architecture search may be used to determine an optimal architecture on a small dataset, and then transfer the architecture to the larger dataset.

At block 516, the machine learning model trainer 130 may train, based on the relevant features selected from the images 106 (as well as the social data 114, and the consumer demographics data 120, and the best fit historical purchase features), the at least one machine learning model 132.

At block 518, with respect to the images 106, the at least one machine learning model 132 may be denoted a multi-label image classification model.

At block 520, the model tester 142 may test the at least one trained machine learning model 132 by selecting, based on the probability analysis, training features from the images 106 (and the social data 114, the consumer demographics data 120, and the historical purchase data 128).

At block 522, the offer generator 146 may generate, by using the at least one trained machine learning model 132, the next best offer 134 for the user 108 for purchase of a product or a service 136.

FIG. 6 illustrates further details of the deep learning process flow of FIG. 5 to illustrate operation of the apparatus 100 in accordance with an example of the present disclosure.

Referring to FIG. 6, block 512 of FIG. 5 is described in further detail with reference to blocks 600-604.

At block 600, a change in the last layer of the neural network may be implemented as described herein with reference to block 512. In this regard, the last layer of the dense convolutional network may be identified.

At block 602, with respect to image classification generally, a dense convolutional network architecture may utilize softmax as a final layer. The softmax layer may be removed. The softmax layer provides for prediction of a single label for an image by ensuring that a sum of probabilities across all classes is one.

At block 604, the softmax layer may be replaced with a sigmoid layer to provide for multi-label prediction. This is because compared to the softmax layer for which a sum of probabilities across all classes is one, for the sigmoid layer, the sum of probabilities for all classes may be greater than one.

Referring to FIG. 6, block 514 of FIG. 5 is described in further detail with reference to blocks 606-612.

With respect to the neural architecture search (NAS) at block 606, at block 608, the NAS may be utilized for automating the design of the artificial neural network.

At block 610, the NAS may be utilized for personality prediction from the images 106.

At block 612, a machine learning model generated by the NAS may be relatively small and include lower complexity, leading to faster real-time predictions.

Figure 7:
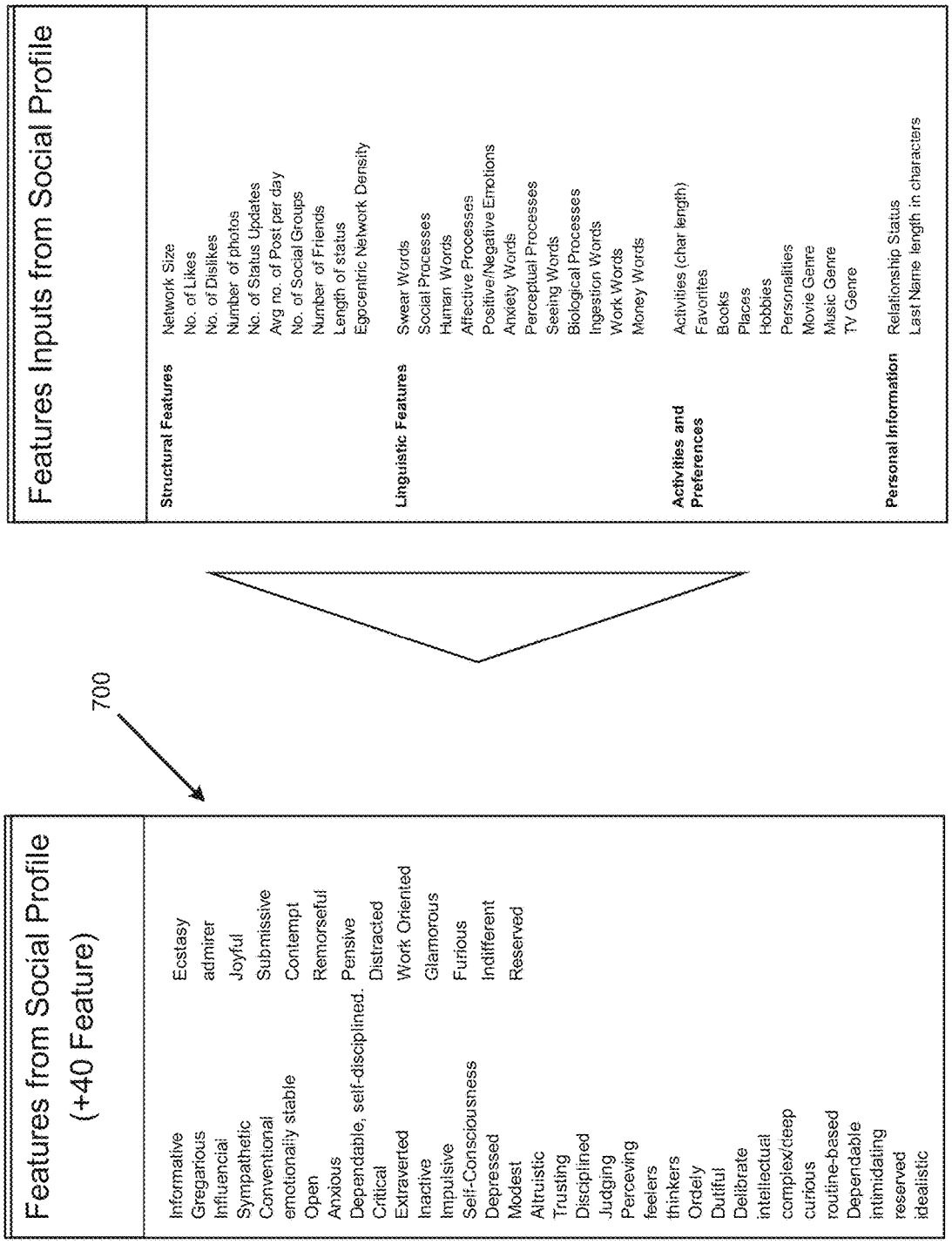
FIG. 7 illustrates social style features and feature inputs from social data to illustrate operation of the personality trait-based customer behavior prediction apparatus of FIG. 1 in accordance with an example of the present disclosure.

FIG. 7 illustrates social style features and feature inputs from social data to illustrate operation of the apparatus 100 in accordance with an example of the present disclosure.

Referring to FIG. 7, with respect to the social data 114, examples of social style features 112 as shown at 700 may include, for example, informative, gregarious, influential, etc.

Figure 8:
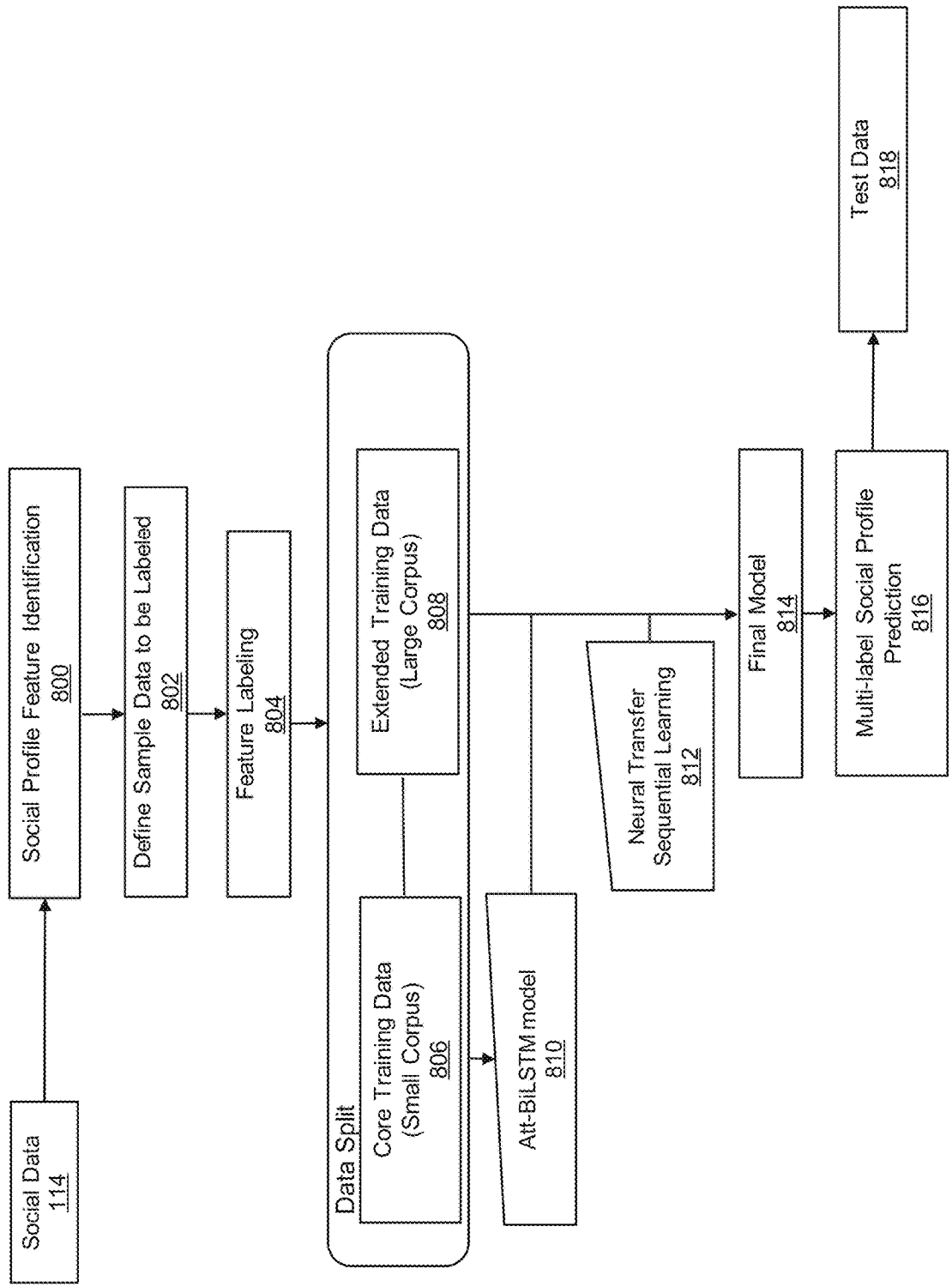
FIG. 8 illustrates social style feature extraction, and a deep learning and transfer learning process flow to illustrate operation of the personality trait-based customer behavior prediction apparatus of FIG. 1 in accordance with an example of the present disclosure.

FIG. 8 illustrates social style feature extraction, and a deep learning and transfer learning process flow to illustrate operation of the apparatus 100 in accordance with an example of the present disclosure.

Referring to FIG. 8, at block 800, the social data analyzer 110 may identify and extract a plurality of social style features 112 from social data 114 associated with the user 108.

At block 802, the social data analyzer 110 may define sample data to be labeled. The sample data may be defined as a best representative of the population in question, and in this context, the tag or label may be assigned to each data point, for example, by data programming (e.g., using scripts to programmatically label data).

At block 804, the social data analyzer 110 may label the plurality of social style features 112. For example, if a user's network size (e.g., structural feature) is relatively large, and the user uploads multiple images and posts in a day, along with sharing of positive and negative emotions (e.g., linguistic feature), the user may be labeled as influential and open at block 700. With respect to data labeling, these features may be marked as 1, while other features may be marked as 0.

At blocks 806 and 808, the data associated with the social style features 112 may be divided into core training data for a relatively small corpus and an extended training data for a relatively large corpus.

At block 810, as described in further detail with reference to FIG. 9, the social data analyzer 110 may extract the plurality of social style features 112 from social data 114 associated with the user 108 by utilizing an attention based bidirectional long short-term memory model to extract the plurality of social style features 112 from social data 114 associated with the user 108. For the attention based bidirectional long short-term memory model, a rectified linear unit activation function may be replaced with a parametric rectified linear unit activation function to solve the problem of Vanishing Gradient to improve model convergence and precision. The attention based bidirectional long short-term memory model may also provide for learning from different modalities, thus providing for analysis and retention of an entire sequence (e.g., sentences from the social data 114).

At block 812, as described in further detail with reference to FIG. 9, the social data analyzer 110 may utilize the attention based bidirectional long short-term memory model and neural transfer learning to extract the plurality of social style features 112 from social data 114 associated with the user 108.

For a final model (e.g., the at least one trained machine learning model 132) that is generated at block 814 with respect to the social data 114, at block 816, the model may be used to perform multi-label social profile prediction. Compared to the multi-label image classification model of block 518, the final model for the social data 114 may be designated a social data classification model.

At block 818, test data may be utilized by the model tester 142 to test the at least one trained machine learning model 132.

Figure 9:
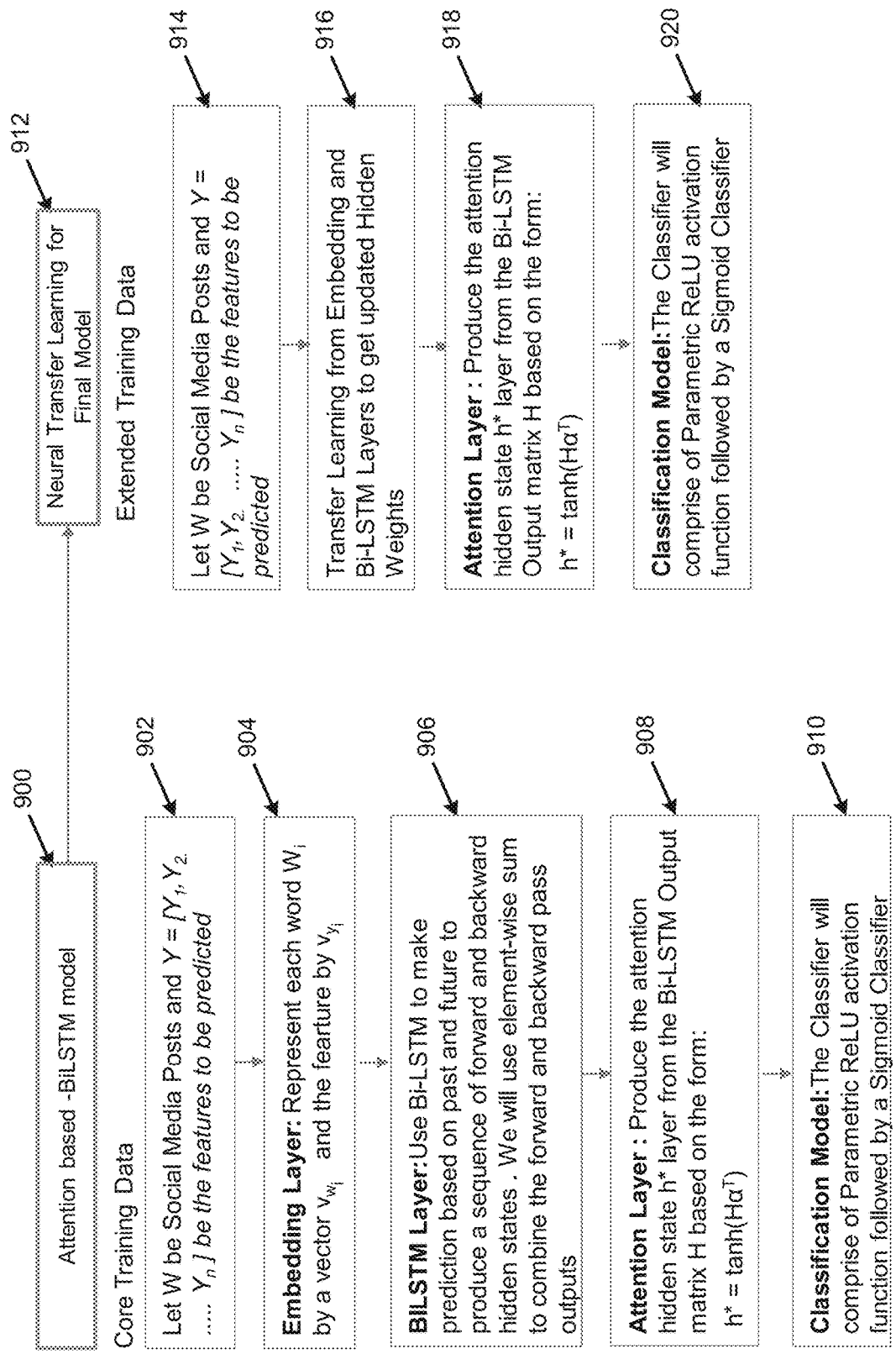
FIG. 9 illustrates further details of the deep learning and transfer learning process flow of FIG. 8 to illustrate operation of the personality trait-based customer behavior prediction apparatus of FIG. 1 in accordance with an example of the present disclosure.

FIG. 9 illustrates further details of the deep learning and transfer learning process flow of FIG. 8 to illustrate operation of the apparatus 100 in accordance with an example of the present disclosure.

Referring to FIG. 9, block 810 of FIG. 8 is described in further detail with reference to blocks 900-910.

With respect to attention based bidirectional long short-term memory model at block 900, for core training data, at block 902, for W specified as social media posts and Y=[$Y_1$, $Y_2 \ldots Y_n$] specified as the features to be predicted, at block 904, an embedding layer may be determined to represent each word $W_i$ by a vector $v_{wi}$ and the feature by $v_{yi}$.

At block 906, the bidirectional long short-term memory layer may be used to perform predictions based on past and future information to produce a sequence of forward and backward hidden states. In this regard, an element-wise sum may be used to combine the forward and backward pass outputs.

At block 908, the attention layer may be used to produce the attention hidden state h* layer from the bidirectional long short-term memory layer output matrix H based on the form:

$$h^* = \tan h(H\alpha^T)$$

where, T is the sentence length, and $\alpha$ is given by:

$$\alpha = \text{softmax}(w^T M),$$

where, w is a trained parameter vector, $w^T$ is the transpose, and $M = \tan h(H)$.

At block 910, the classifier may include a parametric rectified linear unit (ReLU) activation function followed by a sigmoid classifier.

Referring to FIG. 9, block 812 of FIG. 8 is described in further detail with reference to blocks 912-920.

With respect to neural transfer learning for the final model at block 912, for extended training data, at block 914, W may be specified as social media posts and $Y=[Y_1, Y_2 \ldots Y_n]$ may be specified as the features to be predicted.

At block 916, learning from the embedding and bidirectional long short-term memory layers from blocks 904 and 906 may be transferred to determine updated hidden weights.

At block 918, the attention layer may be used to produce the attention hidden state h* layer from the bidirectional long short-term memory layer output matrix H based on the form:

$$h^* = \tan h(H\alpha^T)$$

At block 920, a classifier may include a parametric rectified linear unit activation function followed by a sigmoid classifier.

With respect to FIG. 9, the neural transfer learning may ensure that embedding and attention based bidirectional long short-term memory layers are utilized for the final model on the extended training data. This technique also ensures that the bidirectional long short-term memory layer model is utilized in a large corpus, without spending excessive time in training. Yet further, irrespective of whether there is a sufficiently labelled data set, the neural transfer learning model utilizes the parameters from the model already trained and then transfers these parameters to the larger corpus.

Figure 10:
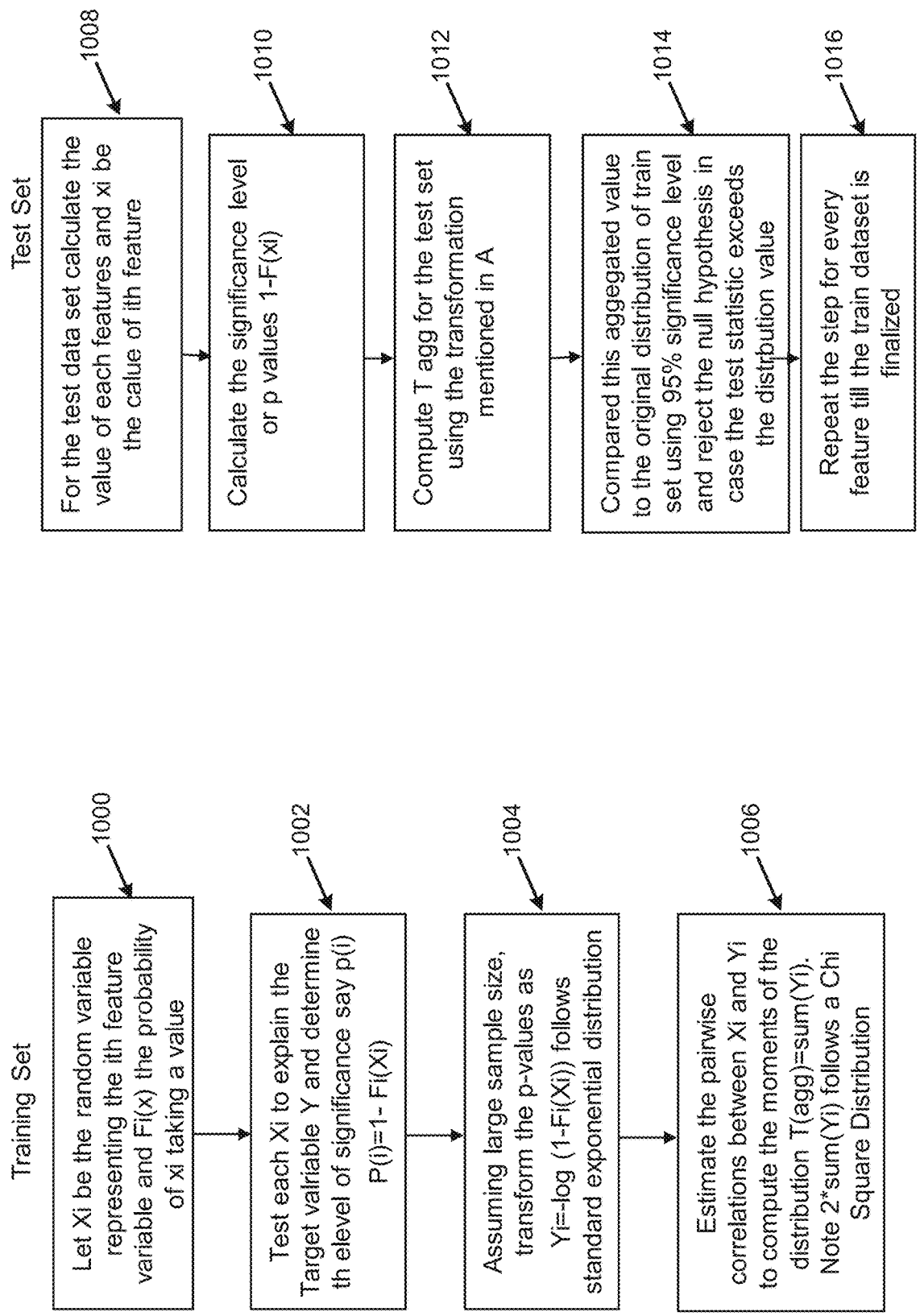
FIG. 10 illustrates details of a probability analysis to combine features to illustrate operation of the personality trait-based customer behavior prediction apparatus of FIG. 1 in accordance with an example of the present disclosure.

FIG. 10 illustrates details of a probability analysis to combine features to illustrate operation of the apparatus 100 in accordance with an example of the present disclosure.

Referring to FIG. 10, block 206 of FIG. 2 is described in further detail with reference to blocks 1000-1006.

With respect to the training set, as disclosed herein, the feature selector 122 may select, based on the probability analysis associated with the weighted distribution of the extracted personality features 104, the weighted distribution of the extracted social style features 112, and the extracted consumer demographics features 118, the relevant features from the images 106, the social data 114, and the consumer demographics data 120 by analyzing, for each feature of the extracted personality features 104, the extracted social style features 112, and the extracted consumer demographics features 118, a random variable representing the feature to test the random variable to explain a target variable. Further, the feature selector 122 may determine a pairwise correlation between the random variable and the target variable.

For example, at block 1000, Xi may be specified as the random variable representing the $i^{th}$ feature variable and Fi(x) may be specified as the probability of Xi taking a value.

At block 1002, each Xi may be tested to explain the target variable Y and determine the level of significance p(i) as $P(i)=1-Fi(Xi)$.

At block 1004, assuming a large sample size, the p-values may be transformed as $Yi=-\log(1-Fi(Xi))$, which follows a standard exponential distribution.

At block 1006, the pairwise correlations between Xi and Yi may be estimated to determine the moments of the distribution T(agg)=sum(Yi) (note: 2*sum(Yi) follows a Chi Square distribution).

Referring to FIG. 10, block 302 of FIG. 3 is described in further detail with reference to blocks 1008-1016.

With respect to the test set, at block 1008, the value of each of the features may be determined, and Xi may represent the value of the $i^{th}$ feature.

At block 1010, the significance level (or p values 1−F(xi)) may be determined.

At block 1012, the model tester 142 may determine T aggregate for the test set using the transformation disclosed herein. With respect to the transformation, each independent variable Xi may be tested to explain the target variable Y and determine the level of significance, $P(i)=1-Fi(Xi)$. Assuming a large sample size, the p-values may be transformed as $Yi=-\log(1-Fi(Xi))$, which follows a standard exponential distribution. Then, T aggregate may be determined by estimating the pairwise correlations between Xi and Yi to determine the moments of the distribution T(agg)=sum(Yi), where 2*sum(Yi) follows a chi square distribution.

At block 1014, the model tester 142 may compare this aggregated value to the original distribution of the training set using 95% significance level, and reject the null hypothesis in case the test statistic exceeds the distribution value.

At block 1016, the model tester 142 may repeat the aforementioned steps for every feature until the training dataset is finalized.

With respect to FIG. 10, the probabilistic approach may ensure a large number of features that are relevant and also statistically robust as the approach of FIG. 10 follows the probabilistic distributions. The probabilistic approach provides for the quantity of features selected being relatively higher (e.g., 10-15% higher). Convergence may also be readily achieved as estimates are performed based on probability distributions and features are added based on standard Chi squared distribution.

Figure 11:
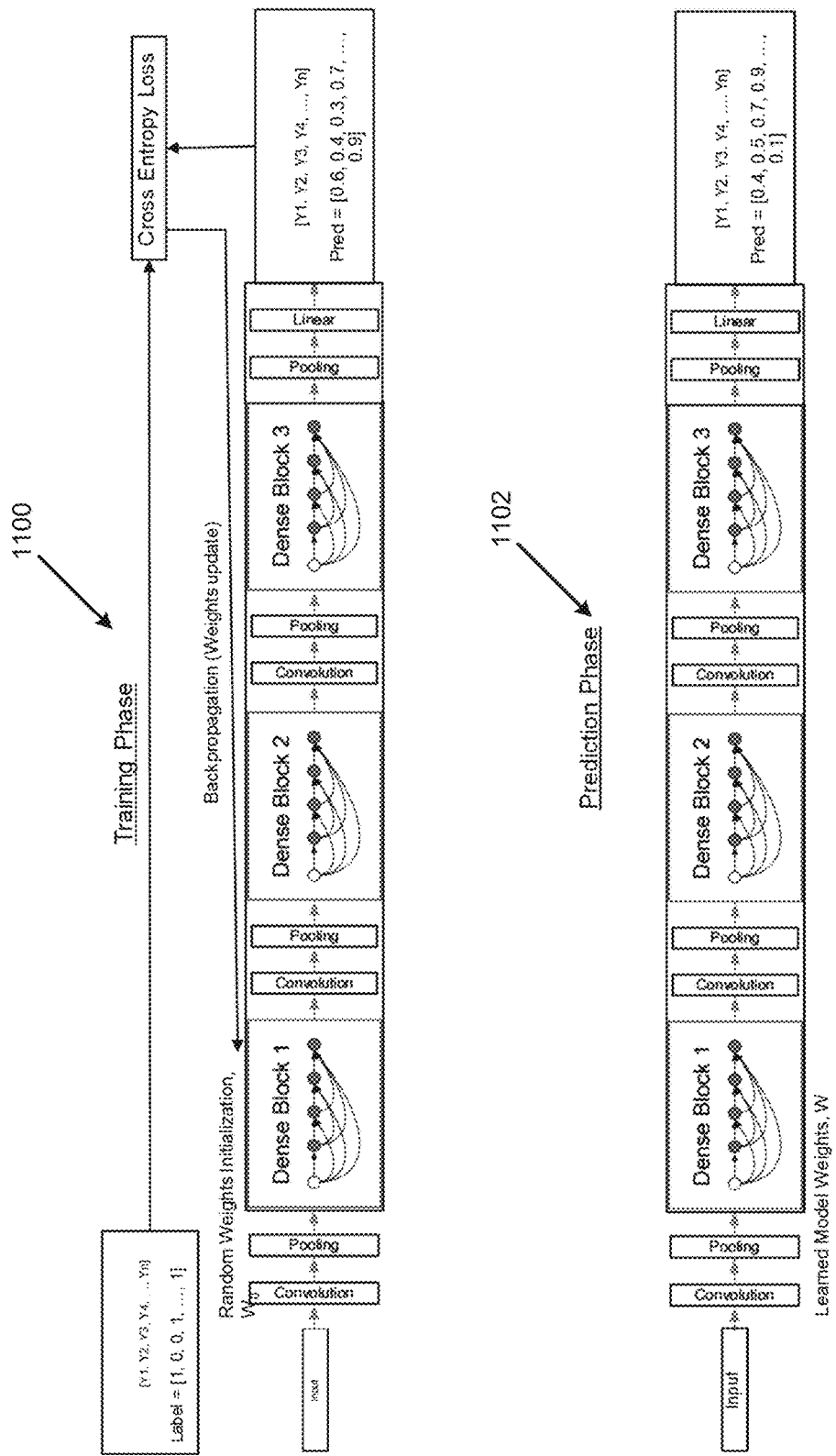
FIG. 11 illustrates a deep learning model architecture to illustrate operation of the personality trait-based customer behavior prediction apparatus of FIG. 1 in accordance with an example of the present disclosure.

FIG. 11 illustrates a deep learning model architecture to illustrate operation of the apparatus 100 in accordance with an example of the present disclosure.

Referring to FIG. 11, the training phase is illustrated at 1100 and the prediction phase is illustrated at 1102. In this regard, in the training phase at 1100, the input may utilize those images that have been labelled and thus true values for the target variable are known. The dense blocks together may define the architecture of the machine learning model. In the training phase at 1100, a random set of weights and model parameters may be utilized to initialize, and the input image may be utilized to obtain predictions. Once the prediction is obtained, it may be compared with the input image's ground truth values, and the model parameters may be updated using backpropagation. In the prediction phase at 1102, after the training is completed, the machine learning model parameters may be finalized. New input images may be sent to the machine learning model, and predictions may be obtained using the trained machine model.

Figure 12:
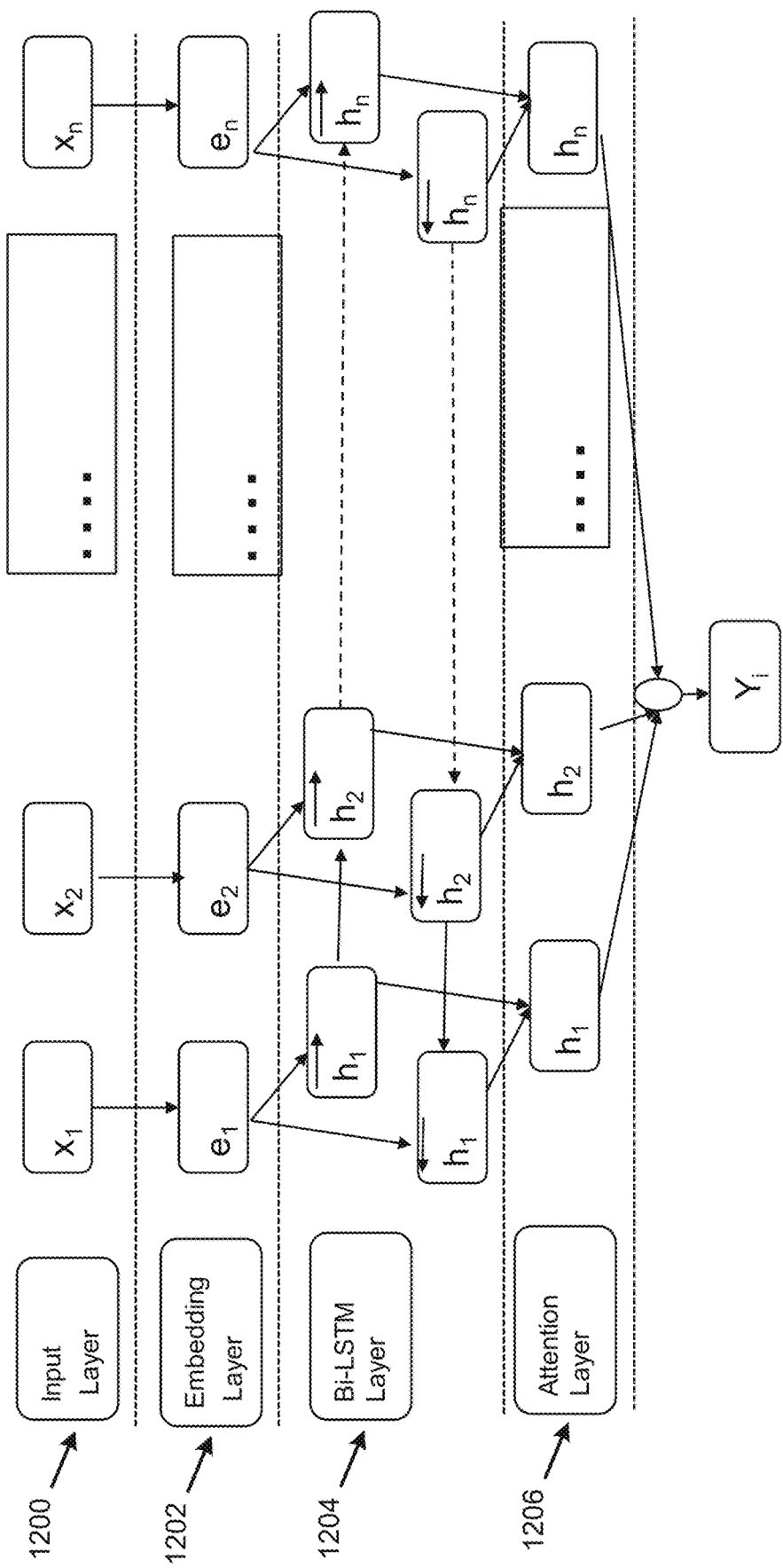
FIG. 12 illustrates an attention based bidirectional long short-term memory (Bi-LSTM) architecture for social profile extraction to illustrate operation of the personality trait-based customer behavior prediction apparatus of FIG. 1 in accordance with an example of the present disclosure.

FIG. 12 illustrates an attention based bidirectional long short-term memory architecture for social profile extraction to illustrate operation of the apparatus 100 in accordance with an example of the present disclosure.

Referring to FIG. 12, the attention based bidirectional long short-term memory architecture of FIG. 12 shows an input layer at 1200 (e.g., input sentence to the machine learning model), an embedding layer at 1202 (e.g., to map each word in the sentence to a low dimensional vector), a bidirectional long short-term memory layer at 1204 (e.g., to obtain high level features), and an attention layer at 1206 (e.g., to produce a weight vector and merge word level features from each time step into a sentence level feature vector, by multiplying the weight vector). As shown in FIG. 12, the first layer includes the input layer at 1200. The input layer at 1200 may include a vector of words $x_t$ as follows:

Given the social data 114 consisting of T words S={$x_1$, $x_2$, $x_3$, $x_4$, ..., $x_t$}, each word in S may be converted into a real-valued vector $e_i$. Thus for each word $x_i$, a look up may be performed at the embedding matrix $W^{wrd} \in Rd^w|V|$, where V is a fixed-sized vocabulary, and $d^w$ is the size of the word embedding. The matrix $W^{wrd}$ is a parameter to be learned. Thus, through this process, a word xi may be transformed into its word embedding ei by using the matrix-vector product:

$$e_i = W^{wrd} v^i,$$

where $v^i$ is a vector of size |V| which has value 1 at index $e_i$ and 0 in all other positions. Then the sentence may be fed into the next layer as a real-valued vectors embs={e1, e2, ... eT}. This becomes the $2^{nd}$ layer designated as the embedding layer at 1202. In the bidirectional long short-term memory layer at 1204, two sub-networks may be introduced for the left and right sequence (e.g., see FIG. 12), which are the backward and forward pass respectively. In this regard, the element wise sum may be used to combine the backward and forward pass outputs. In the final attention layer at 1206, H may be specified as a matrix consisting of output vectors [h1, h2, ..., hT] that the bidirectional long short-term memory layer at 1204 produced, where T is the sentence length. The representation r of the sentence may be formed by a weighted sum of these output vectors as follows:

$$M = \tan h(H)$$

$$\alpha = \text{softmax}(w^T M)$$

$$T = H\alpha^T$$

where $H \in Rdw \times T$, dw is the dimension of the word vectors, w is a trained parameter vector, $w^T$ is a transpose, and H becomes the attention layer at 1206.

Referring to FIGS. 1-12 generally, with respect to the dense convolutional network as disclosed herein, the difference between usage of sigmoid and softmax as a last layer of the dense convolutional network is described in further detail.

With respect to softmax, the dense convolutional network may be implemented with a softmax output as follows. Let I be the input $$X_0 = I$$

for i=1 to n, $$X_L = H_L([X_0, X_1, \ldots, X_{L-1}])$$

where,
n is the number of densely concatenated convolutional layers in the network,
$H_L$ represents the $L^{th}$ layer operations combining concatenation and activation, and
$X_L$ represents the output of the $L^{th}$ layer.

$$X_{n+1} = \text{GlobalAveragePooling2D}(X_n)$$

$$\text{Output} = \text{Softmax}(X_{n+1})$$

where, the (unit) softmax function $\alpha: \mathbb{R}^K \to \mathbb{R}^K$ is defined as follows:

$$\sigma(z)_i = \frac{e^{z_i}}{\sum_{j=1}^{K} e^{z_j}} \text{ for } i = 1, \ldots, K \text{ and } z = (z_1, \ldots, z_K) \in \mathbb{R}^K$$

In this regard, the exponential function may be applied to each element $Z_i$ of the input vector Z and the values may be normalized by dividing by the sum of all these exponentials. This normalization ensures that the sum of the components of the output vector σ(z) is 1 and each individual component of the output vector, $\sigma(z)_i$ lie in the range 0 to 1.

With respect to sigmoid, the dense convolutional network may be implemented with a sigmoid output as follows.
Let I be the input $$X_0 = I$$

for i=1 to n, $$X_L = H_L([X_0, X_1, \ldots, X_{L-1}])$$

where,
n is the number of densely concatenated convolutional layers in the network,
$H_L$ represents the $L^{th}$ layer operations combining concatenation and activation, and
$X_L$ represents the output of the $L^{th}$ layer, $$X_{n+1} = \text{GlobalAveragePooling2D}(X_n)$$

$$\text{Output} = \text{Sigmoid}(X_{n+1})$$

where, the sigmoid function S: $\mathbb{R}^K \to \mathbb{R}^K$ is defined as follows:

$$S(z)_i = \frac{1}{1 + e^{-z_i}} \text{ for } i = 1, \ldots, K \text{ and } z = (z_1, \ldots, z_K) \in \mathbb{R}^K$$

In this regard, the function $$f(x) = \frac{1}{1 + e^{-x}}$$

may be applied to each element $Z_i$ of the input vector Z, but the elements are not normalized, and thus, there is no restriction on the sum of components of output vector to be 0. Individual components of the output vector lie in the range of 0 to 1.

An example of implementation of the dense convolutional network is as follows.

Assuming that the output includes four classes (e.g., confident ($Y_1$), fearful ($Y_2$), anxious ($Y_3$), influencer ($Y_4$)), then prediction vector Y may be specified as Y=[$Y_1$, $Y_2$, $Y_3$, $Y_4$].
For example,
A prediction of [0, 0, 0, 1]->
confident ($Y_1$)=0
fearful ($Y_2$)=0
anxious ($Y_3$)=0
influencer ($Y_4$)=1
Thus, the prediction is: not confident, not fearful, not anxious, but an influencer.
According to another example, a multi-label prediction of [1, 0, 1, 1]->
confident ($Y_1$)=1
fearful ($Y_2$)=0
anxious ($Y_3$)=1
influencer ($Y_4$)=1
Thus, the prediction is: confident, not fearful, anxious, influencer.
For a particular example, assuming that the output of GlobalAveragePooling2D ($X_n$) (as described above) is $X_{n+1}=[5, -3, 0, 7]$, in this regard, for $\sigma(X_{n+1})$, the softmax results may be determined as follows.
=$\sigma([5, -3, 0, 7])$
=[0.11911, 0.00004, 0.00073, 0.88012]
The values sum to 1, and the values represent probabilities of belonging to classes $Y_1, Y_2, Y_3, Y_4$ respectively, and since they sum to 1, an instance may belong to only one class at a time. Then, applying argmax (e.g., an operation that finds the argument that gives the maximum value from a target function), the final prediction may be specified as:
Y=[0, 0, 0, 1]->
   confident $(Y_1)$=0
   fearful $(Y_2)$=0
   anxious $(Y_3)$=0
   influencer $(Y_4)$=1
In this regard, the prediction is: not confident, not fearful, not anxious, and influencer.

For the aforementioned particular example, assuming that the output of GlobalAveragePooling2D $(X_n)$ (as described above) is $X_{n+1}=[5, -3, 0, 7]$, in this regard, for $S(X_{n+1})$, the sigmoid results may be determined as follows.
=S([5, -3, 0, 7])
=[0.99331, 0.04743, 0.47502, 0.99909]
In this case, the values do not sum to 1, and the values represent confidence scores of belonging to classes $Y_1$, $Y_2$, $Y_3$, $Y_4$ respectively, and an instance may belong to one or more classes. Thereafter, with thresholding above 0.5, the final prediction may be specified as:
Y=[1, 0, 0, 1]->
   confident $(Y_1)$=1
   fearful $(Y_2)$=0
   anxious $(Y_3)$=0
   influencer $(Y_4)$=1
In this regard, the prediction is confident, not fearful, not anxious, and influencer.

Referring again to FIG. 1, with respect to the aforementioned example of the cosmetics web application in the cosmetics industry, another example is disclosed herein with respect to a travel web application for the travel industry. In this regard, the travel application may be used to create travel bookings to track places visited, routes, travel statistics, travel pictures, etc. The travel application may also include information such as customer profile, which may be utilized to link to other social media sites such as Facebook™, Instagram™, etc. The images 106 for the travel application example may include a profile picture of the user 108, pictures of travel companies, pictures of hotels, pictures of travel activities, etc. For the example of the travel application, the social data 114 may include, for example, travel sites, visits/subscriptions, travel videos/channel subscriptions, hotel group subscriptions, etc. Further, the consumer demographics data 120 and historical purchase data 128 may include, for example, hotel stay information (e.g., 4 star, 5 star, etc.), travel accessories purchased, mode of transportation, etc. The offer generator 146 may generate, by using the at least one trained machine learning model 132, a next best offer 134 for the user 108 for purchase of a next best travel recommendation. With respect to an example of the next best travel recommendation, the recommendation may include intelligent and hyper-personal travel based recommendations based on the images 106, the social data 114, the consumer demographics data 120, and the user's past travel related purchases. For example, if the user 108 utilizes the apparatus 100 to plan a travel itinerary, based on image based personality traits (e.g., whether the user loves nature versus historic places), the social data 114 (e.g., the kind of places, restaurants the user likes and mentions], the demographics data 120 (e.g., age, gender, marital status, etc.), and historical purchase data 128, the offer generator 146 may intelligently recommend which destinations the user can visit. Similarly, if the user 108 is in a tourist destination, the offer generator 146 may generate the offer 134 (e.g., recommendation) that includes other nearby tourist attractions or restaurants the user can visit, etc.

Figure 13:
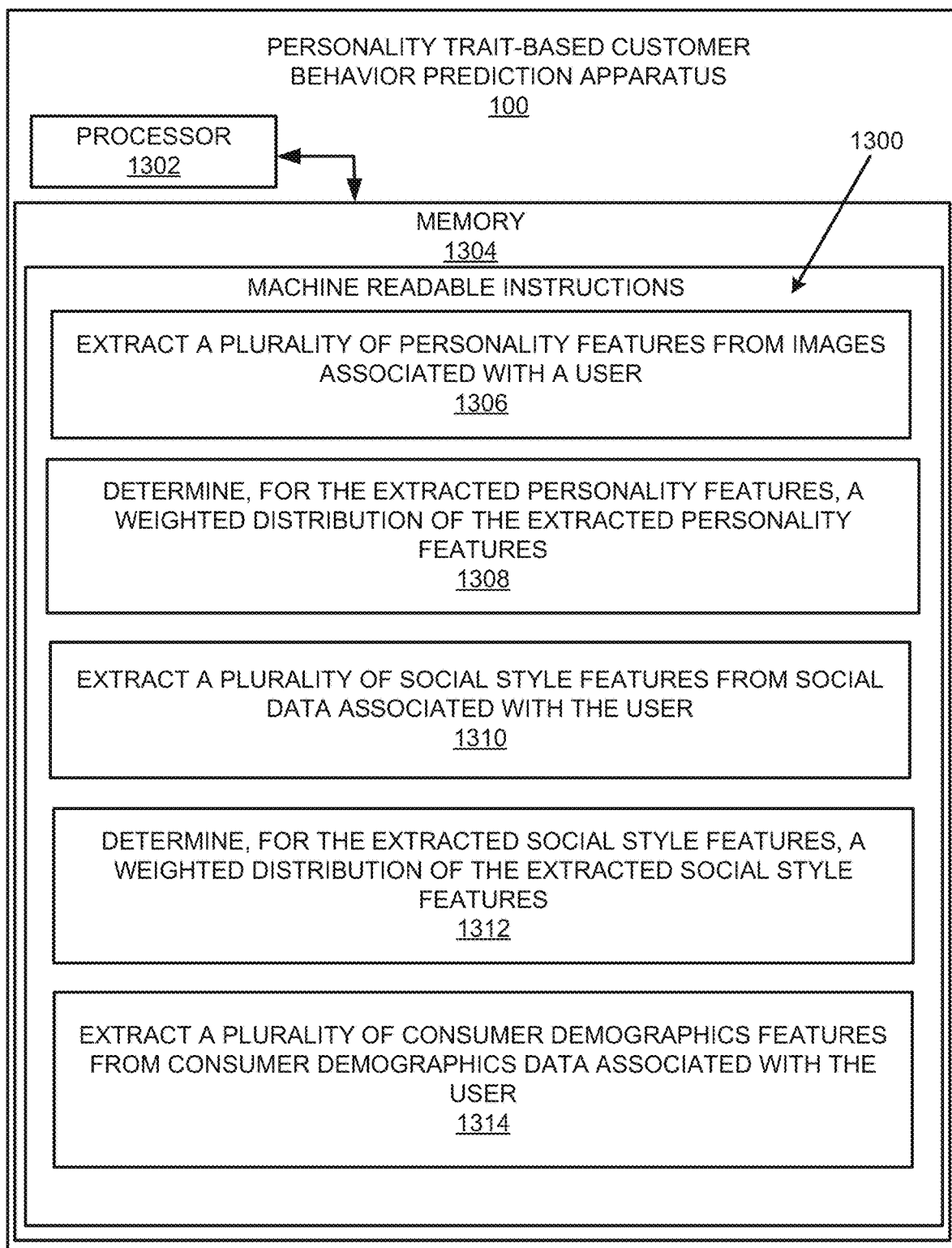
FIG. 13 illustrates an example block diagram for personality trait-based customer behavior prediction in accordance with an example of the present disclosure.
Figure 13:
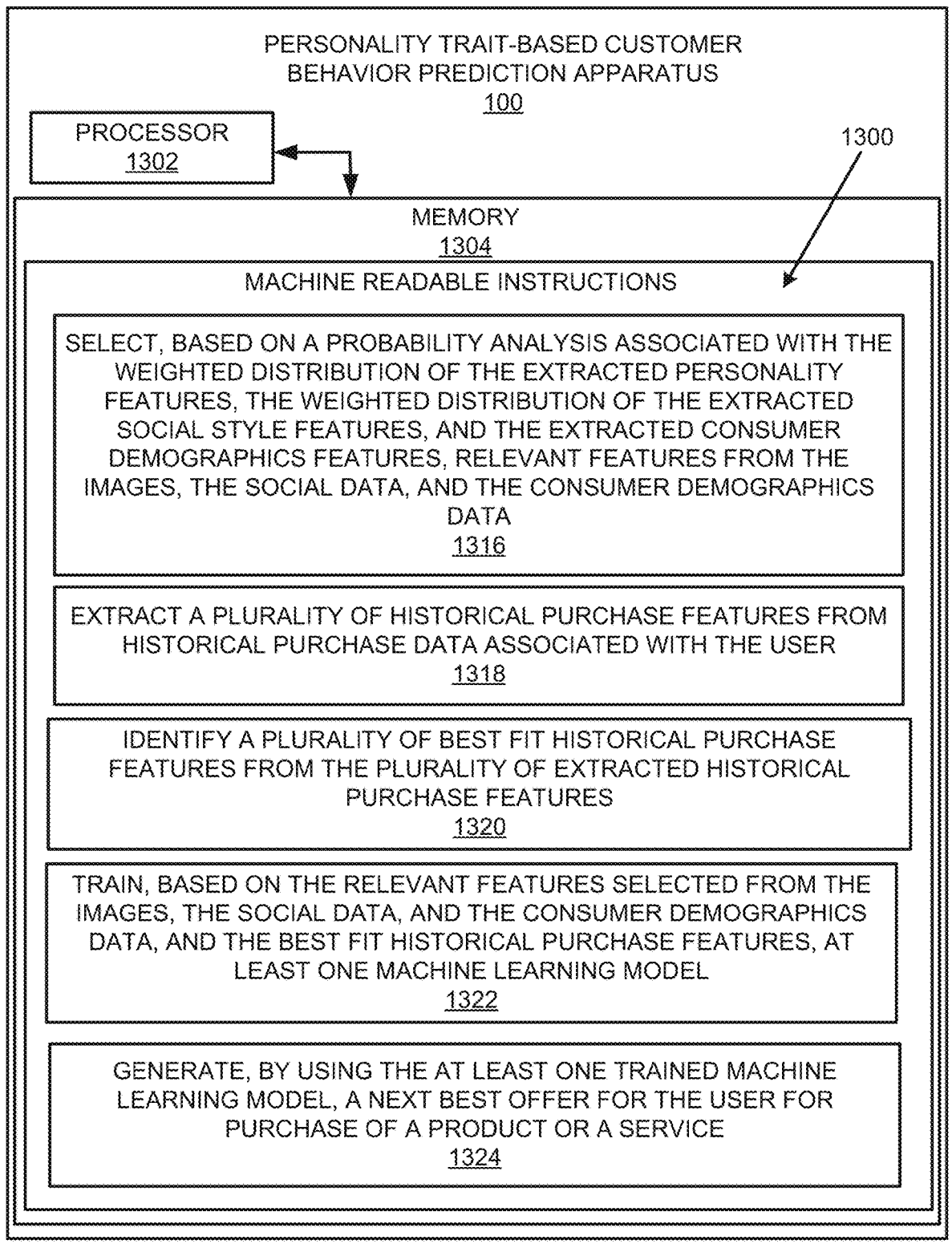
Figure 13:
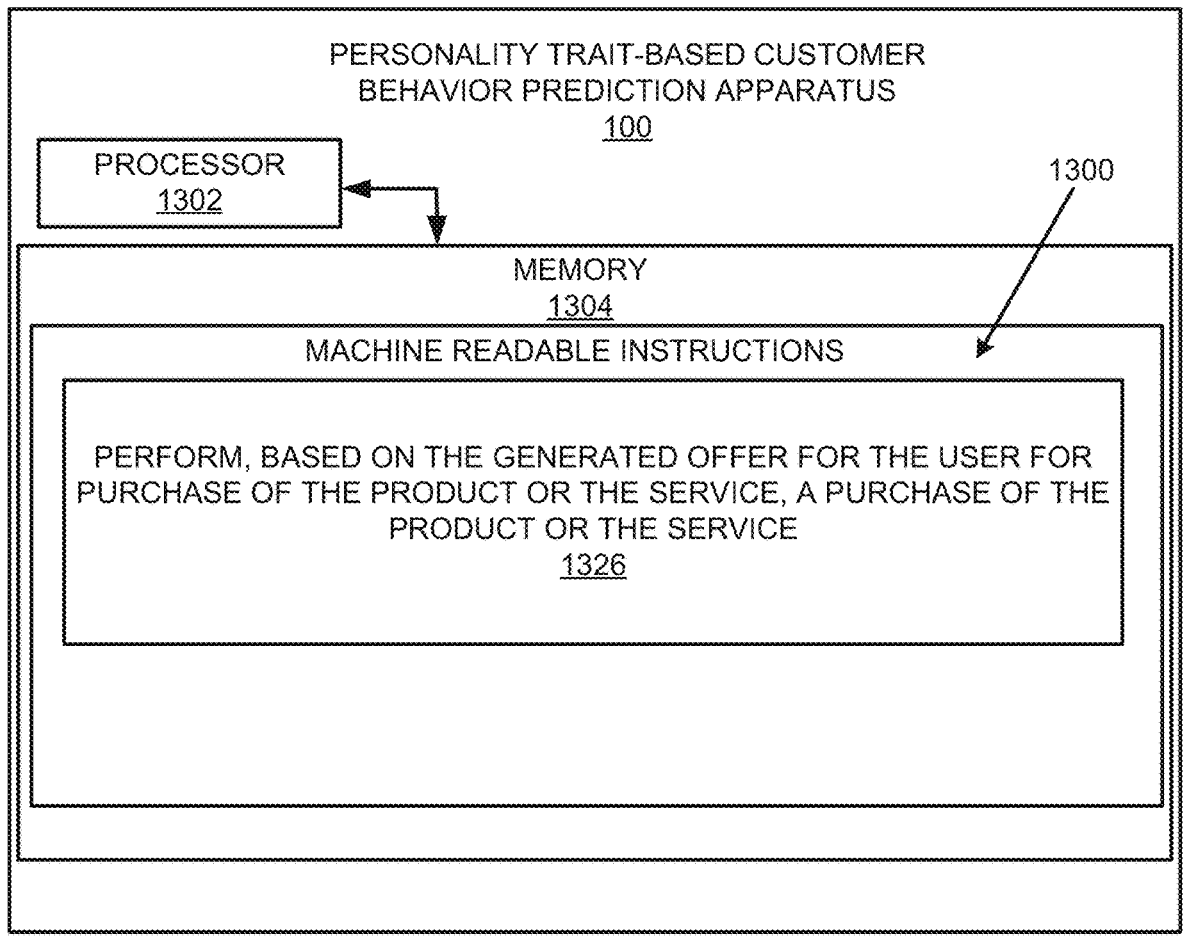
Figure 15:
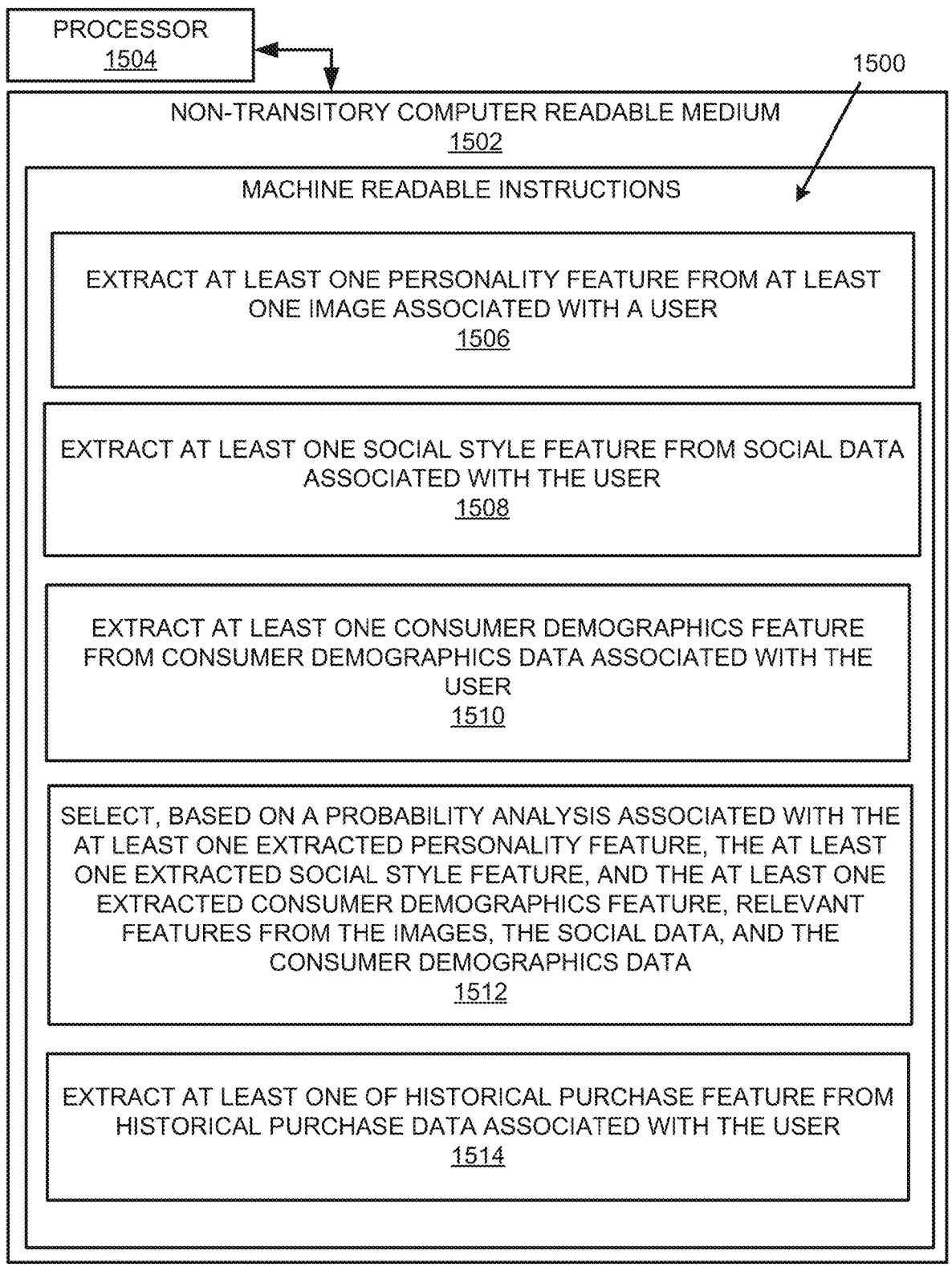
FIG. 15 illustrates a further example block diagram for personality trait-based customer behavior prediction in accordance with another example of the present disclosure.
Figure 15:
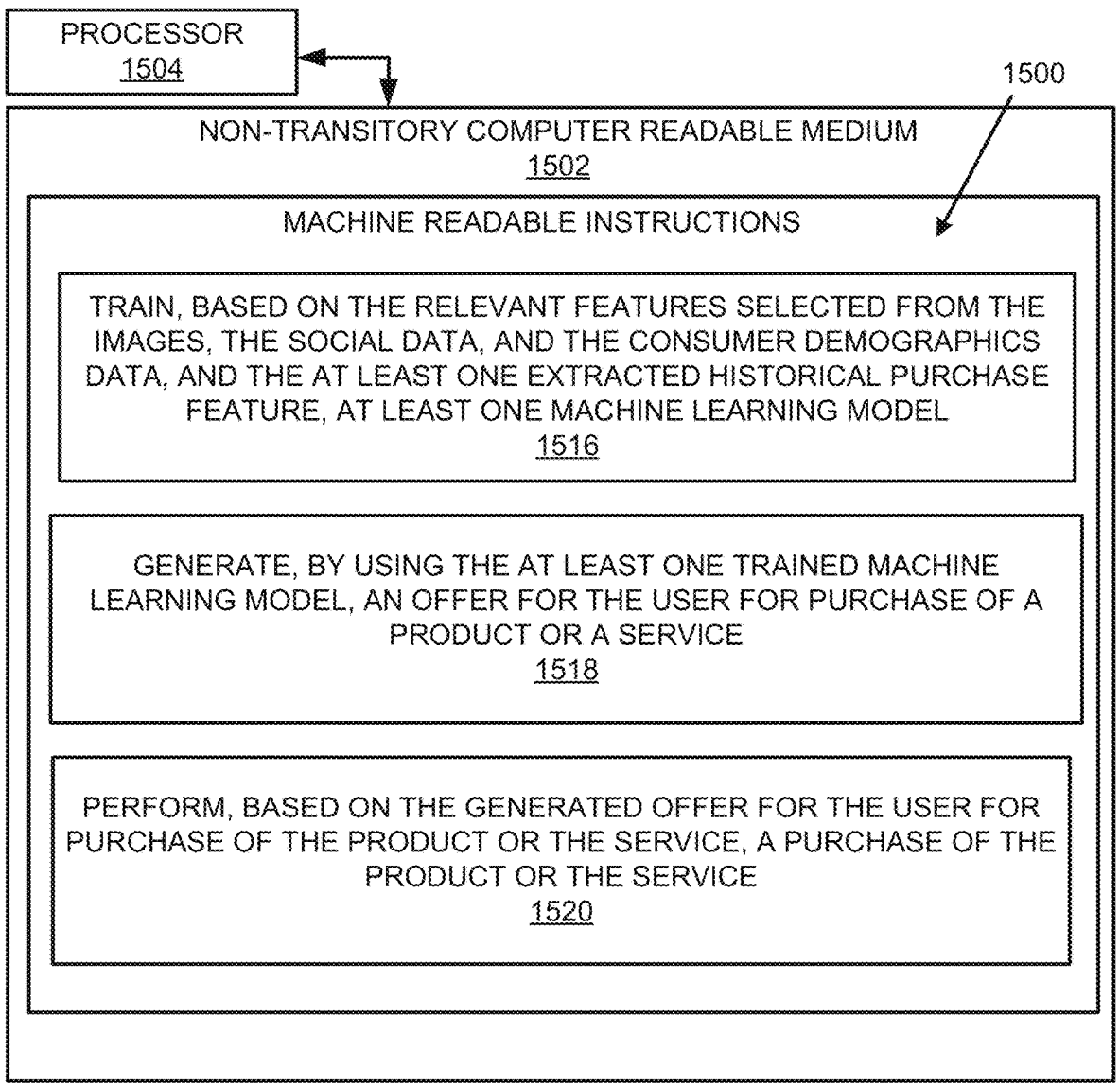

FIGS. 13-15 respectively illustrate an example block diagram 1300, a flowchart of an example method 1400, and a further example block diagram 1500 for personality trait-based customer behavior prediction, according to examples. The block diagram 1300, the method 1400, and the block diagram 1500 may be implemented on the apparatus 100 described above with reference to FIG. 1 by way of example and not of limitation. The block diagram 1300, the method 1400, and the block diagram 1500 may be practiced in other apparatus. In addition to showing the block diagram 1300, FIG. 13 shows hardware of the apparatus 100 that may execute the instructions of the block diagram 1300. The hardware may include a processor 1302, and a memory 1304 storing machine readable instructions that when executed by the processor cause the processor to perform the instructions of the block diagram 1300. The memory 1304 may represent a non-transitory computer readable medium. FIG. 14 may represent an example method for personality trait-based customer behavior prediction, and the steps of the method. FIG. 15 may represent a non-transitory computer readable medium 1502 having stored thereon machine readable instructions to provide personality trait-based customer behavior prediction according to an example. The machine readable instructions, when executed, cause a processor 1504 to perform the instructions of the block diagram 1500 also shown in FIG. 15.

The processor 1302 of FIG. 13 and/or the processor 1504 of FIG. 15 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1502 of FIG. 15), such as hardware storage devices (e.g., RAM (random access memory), ROM (read only memory), EPROM (erasable, programmable ROM), EEPROM (electrically erasable, programmable ROM), hard drives, and flash memory). The memory 1304 may include a RAM, where the machine readable instructions and data for a processor may reside during runtime.

Referring to FIGS. 1-13, and particularly to the block diagram 1300 shown in FIG. 13, the memory 1304 may include instructions 1306 to extract a plurality of personality features 104 from images 106 associated with a user 108.

The processor 1302 may fetch, decode, and execute the instructions 1308 to determine, for the extracted personality features 104, a weighted distribution of the extracted personality features 104.

The processor 1302 may fetch, decode, and execute the instructions 1310 to extract a plurality of social style features 112 from social data 114 associated with the user 108.

The processor 1302 may fetch, decode, and execute the instructions 1312 to determine, for the extracted social style features 112, a weighted distribution of the extracted social style features 112.

The processor 1302 may fetch, decode, and execute the instructions 1314 to extract a plurality of consumer demographics features 118 from consumer demographics data 120 associated with the user 108.

The processor 1302 may fetch, decode, and execute the instructions 1316 to select, based on a probability analysis associated with the weighted distribution of the extracted personality features 104, the weighted distribution of the extracted social style features 112, and the extracted consumer demographics features 118, relevant features from the images 106, the social data 114, and the consumer demographics data 120.

The processor 1302 may fetch, decode, and execute the instructions 1318 to extract a plurality of historical purchase features 126 from historical purchase data 128 associated with the user 108.

The processor 1302 may fetch, decode, and execute the instructions 1320 to identify a plurality of best fit historical purchase features from the plurality of extracted historical purchase features 126.

The processor 1302 may fetch, decode, and execute the instructions 1322 to train, based on the relevant features selected from the images 106, the social data 114, and the consumer demographics data 120, and the best fit historical purchase features, at least one machine learning model 132.

The processor 1302 may fetch, decode, and execute the instructions 1324 to generate, by using the at least one trained machine learning model 132, a next best offer 134 for the user 108 for purchase of a product or a service 136.

The processor 1302 may fetch, decode, and execute the instructions 1326 to perform, based on the generated offer 134 for the user 108 for purchase of the product or the service 136, a purchase of the product or the service 136.

Referring to FIGS. 1-12 and 14, and particularly FIG. 14, for the method 1400, at block 1402, the method may include extracting a plurality of personality features 104 from images 106 associated with a user 108.

At block 1404, the method may include extracting a plurality of social style features 112 from social data 114 associated with the user 108.

At block 1406, the method may include extracting a plurality of consumer demographics features 118 from consumer demographics data 120 associated with the user 108.

At block 1408, the method may include selecting based on a probability analysis associated with the extracted personality features 104, the extracted social style features 112, and the extracted consumer demographics features 118, relevant features from the images 106, the social data 114, and the consumer demographics data 120.

At block 1410, the method may include extracting a plurality of historical purchase features 126 from historical purchase data 128 associated with the user 108.

At block 1412, the method may include training based on the relevant features selected from the images 106, the social data 114, and the consumer demographics data 120, and the extracted historical purchase features 126, at least one machine learning model.

At block 1414, the method may include generating by using the at least one trained machine learning model, a next best offer for the user 108 for purchase of a product or a service.

At block 1416, the method may include performing based on the generated offer for the user 108 for purchase of the product or the service, a purchase of the product or the service.

Referring to FIGS. 1-12 and 15, and particularly FIG. 15, for the block diagram 1500, the non-transitory computer readable medium 1502 may include instructions 1506 to extract at least one personality feature from at least one image associated with a user 108.

The processor 1504 may fetch, decode, and execute the instructions 1508 to extract at least one social style feature from social data 114 associated with the user 108.

The processor 1504 may fetch, decode, and execute the instructions 1510 to extract at least one consumer demographics feature from consumer demographics data 120 associated with the user 108.

The processor 1504 may fetch, decode, and execute the instructions 1512 to select, based on a probability analysis associated with the at least one extracted personality feature, the at least one extracted social style feature, and the at least one extracted consumer demographics feature, relevant features from the images 106, the social data 114, and the consumer demographics data 120.

The processor 1504 may fetch, decode, and execute the instructions 1514 to extract at least one of historical purchase feature from historical purchase data 128 associated with the user 108.

The processor 1504 may fetch, decode, and execute the instructions 1516 to train, based on the relevant features selected from the images 106, the social data 114, and the consumer demographics data 120, and the at least one extracted historical purchase feature, at least one machine learning model.

The processor 1504 may fetch, decode, and execute the instructions 1518 to generate, by using the at least one trained machine learning model, an offer for the user 108 for purchase of a product or a service.

The processor 1504 may fetch, decode, and execute the instructions 1520 to perform, based on the generated offer for the user 108 for purchase of the product or the service, a purchase of the product or the service.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A personality trait-based customer behavior prediction apparatus comprising:
   an image analyzer, executed by at least one hardware processor, to
      extract a plurality of personality features from images associated with a user by
         utilizing a dense convolutional network architecture that includes a sigmoid function to implement multi-label classification, and a neural architecture search to extract the plurality of personality features, and
      determine, for the extracted personality features, a weighted distribution of the extracted personality features;
   a social data analyzer, executed by the at least one hardware processor, to
      extract a plurality of social style features from social data associated with the user, and
      determine, for the extracted social style features, a weighted distribution of the extracted social style features;

a consumer demographics analyzer, executed by the at least one hardware processor, to
  extract a plurality of consumer demographics features from consumer demographics data associated with the user;
a feature selector, executed by the at least one hardware processor, to
  select, based on a probability analysis associated with the weighted distribution of the extracted personality features, the weighted distribution of the extracted social style features, and the extracted consumer demographics features, relevant features from the images, the social data, and the consumer demographics data;
a historical purchase analyzer, executed by the at least one hardware processor, to
  extract a plurality of historical purchase features from historical purchase data associated with the user, and
  identify a plurality of best fit historical purchase features from the plurality of extracted historical purchase features;
a machine learning model trainer, executed by the at least one hardware processor, to
  train, based on the relevant features selected from the images, the social data, and the consumer demographics data, and the best fit historical purchase features, at least one machine learning model;
an offer generator, executed by the at least one hardware processor, to
  generate, by using the at least one trained machine learning model, a next best offer for the user for purchase of a product or a service; and
a purchase implementer, executed by the at least one hardware processor, to
  perform, based on the generated offer for the user for purchase of the product or the service, a purchase of the product or the service.

2. The personality trait-based customer behavior prediction apparatus according to claim 1, further comprising:
a feature transformer, executed by the at least one hardware processor, to
  transform a feature set that includes the weighted distribution of the extracted personality features and the weighted distribution of the extracted social style features to generate additional features, wherein
the feature selector is executed by the at least one hardware processor to
  select, based on the probability analysis associated with the weighted distribution of the extracted personality features, the weighted distribution of the extracted social style features, the generated additional features,and the extracted consumer demographics features, the relevant features from the images, the social data, and the consumer demographics data.

3. The personality trait-based customer behavior prediction apparatus according to claim 1, wherein the social data analyzer is executed by the at least one hardware processor to extract the plurality of social style features from social data associated with the user by:
  utilizing an attention based bidirectional long short-term memory model to extract the plurality of social style features from social data associated with the user.

4. The personality trait-based customer behavior prediction apparatus according to claim 1, wherein the social data analyzer is executed by the at least one hardware processor to extract the plurality of social style features from social data associated with the user by:
  utilizing an attention based bidirectional long short-term memory model and neural transfer learning to extract the plurality of social style features from social data associated with the user.

5. The personality trait-based customer behavior prediction apparatus according to claim 1, wherein the feature selector is executed by the at least one hardware processor to select, based on the probability analysis associated with the weighted distribution of the extracted personality features, the weighted distribution of the extracted social style features, and the extracted consumer demographics features, the relevant features from the images, the social data, and the consumer demographics data by:
  for each feature of the extracted personality features, the extracted social style features, and. the extracted consumer demographics features,
    analyzing a random variable representing the feature to test the random variable to explain a target variable; and
    determining a pairwise correlation between the random variable and the target variable.

6. The personality trait-based customer behavior prediction apparatus according to claim 1, further comprising:
a model tester, executed by the at least one hardware processor, to:
  test the at least one trained machine learning model by selecting, based on the probability analysis, training features from the images, the social data, the consumer demographics data, and the historical purchase data; and
  utilizing parameters of the at least one trained machine learning model to quantify an impact of the selected training features on key performance indicators.

7. A method for personality trait-based customer behavior prediction, the method comprising:
  extracting, by at least one hardware processor, a plurality of personality features from images associated with a user by utilizing a dense convolutional network architecture that includes a sigmoid function to implement multi-label classification, and a neural architecture search to extract the plurality of personality features;
  determining, by the at least one hardware processor, for the extracted personality features, a weighted distribution of the extracted personality features;
  extracting, by the at least one hardware processor, a plurality of social style features from social data associated with the user;
  determining, by the at least one hardware processor, for the extracted social style features, a weighted distribution of the extracted social style features;
  extracting, by the at least one hardware processor, a plurality of consumer demographics features from consumer demographics data associated with the user;
  selecting, by the at least one hardware processor, based on a probability analysis associated with the weighted distribution of the extracted personality features, the weighted distribution of the extracted social style features, and the extracted consumer demographics features, relevant features from the images, the social data, and the consumer demographics data;
  extracting, by the at least one hardware processor, a plurality of historical purchase features from historical purchase data associated with the user;
  identifying, by the at least one hardware processor, a plurality of best fit historical purchase features from the plurality of extracted historical purchase features;

training, by the at least one hardware processor, based on the relevant features selected from the images, the social data, and the consumer demographics data, and the bestfit historical purchase features, at least one machine learning model;

generating, by the at least one hardware processor, by using the at least one trained machine learning model, a next best offer for the user for purchase of a product or a service; and performing, by the at least one hardware processor, based on the generated offer for the user for purchase of the product or the service, a purchase of the product or the service.

8. The method for personality trait-based customer behavior prediction according to claim 7, wherein extracting, by the at least one hardware processor, the plurality of social style features from social data associated with the user further comprises:

utilizing, by the at least one hardware processor, an attention based bidirectional long short-term memory model to extract the plurality of social style features from social data associated with the user.

9. The method for personality trait-based customer behavior prediction according to claim 7, wherein extracting, by the at least one hardware processor, the plurality of social style features from social data associated with the user further comprises:

utilizing, by the at least one hardware processor, an attention based bidirectional long short-term memory model and neural transfer learning to extract the plurality of social style features from social data associated with the user.

10. The method for personality trait-based customer behavior prediction according to claim 7, wherein selecting, by the at least one hardware processor, based on the probability analysis associated with the weighted distribution of the extracted personality features, the weighted distribution of the extracted social style features, and the extracted consumer demographics features, the relevant features from the images, the social data, and the consumer demographics data further comprises:

for each feature of the extracted personality features, the extracted social style features, and the extracted consumer demographics features,
analyzing, by the at least one hardware processor, a random variable representing the feature to test the random variable to explain a target variable; and
determining, by the at least one hardware processor, a pairwise correlation between the random variable and the target variable.

11. The method for personality trait-based customer behavior prediction according to claim 7, further comprising:

testing, by the at least one hardware processor, the at least one trained machine learning model by selecting, based on the probability analysis, training features from the images, the social data, the consumer demographics data, and the historical purchase data; and
utilizing, by the at least one hardware processor, parameters of the at least one trained machine learning model to quantify an impact of the selected training features on key perfonuance indicators.

12. A non-transitory computer readable medium having stored thereon machine readable instructions, the machine readable instructions, when executed by at least one hardware processor, cause the at least one hardware processor to:

extract at least one personality feature from at least one image associated with a user by utilizing a dense convolutional network architecture that includes a sigmoid function to implement multi-label classification, and a neural architecture search to extract the at least one personality feature;

determine, for the at least one extracted personality feature, a weighted distribution of the at least one extracted personality feature;

extract at least one social style feature from social data associated with the user;

determine, for the at least one extracted social style feature, a weighted distribution of the at least one extracted social style feature;

extract at least one consumer demographics feature from consumer demographics data associated with the user;

select, based on a probability analysis associated with the weighted distribution of the at least one extracted personality feature, the weighted distribution of the at least one extracted social style feature, and the at least one extracted consumer demographics feature, relevant features from the images, the social data, and the consumer demographics data;

extract at least one historical purchase feature from historical purchasedata associatedwith the user;

identify a plurality of best fit historical purchase features from the plurality of extracted historical purchase features;

train, based on the relevant features selected from the images, the social data, and the consumer demographics data, and the at least one extracted historical purchase feature, at least one machine learning model;

generate, by using the at least one trained machine learning model, an offer for the user for purchase of a product or a service; and perform, based on the generated offer for the user for purchase of the product or the service, a purchase of the product or the service.

13. The non-transitory computer readable medium according to claim 12, wherein the machine readable instructions to extract the at least one social style feature from the social data associated with the user, when executed by the at least one hardware processor, further cause the at least one hardware processor to:

utilize an attention based bidirectional long short-term memory model and neural transfer learning to extract the at least one social style feature from the social data associated with the user.

14. The non-transitory computer readable medium according to claim 12, wherein the machine readable instructions to select, based on the probability analysis associated with the weighted distribution of the at least one extracted personality feature, the weighted distribution of the at least one extracted social style feature, and the at least one extracted consumer demographics feature, relevant features from the images, the social data, and the consumer demographics data, when executed by the at least one hardware processor, further cause the at least one hardware processor to:

for each feature of the at least one extracted personality feature, the at least one extracted social style feature, and the at least one extracted consumer demographics feature,
analyze a random variable representing the feature to test the random variable to explain a target variable; and determine a pairwise correlation between the random variable and the target variable.

15. The non-transitory computer readable medium according to claim 12, wherein the machine readable instructions, when executed by the at least one hardware processor, further cause the at least one hardware processor to:
  test the at least one trained machine learning model by selecting, based on the probability analysis, training features from the at least one image, the social data, the consumer demographics data, and the historical purchase data; and
  utilize parameters of the at least one trained machine learning model to quantify an impact of the selected training features on key performance indicators.

* * * * *

UNITED STATES PATENT AND TRADEMARK OFFICE
CERTIFICATE OF CORRECTION

PATENT NO. : 11,416,884 B2
APPLICATION NO. : 16/925024
DATED : August 16, 2022
INVENTOR(S) : Sanjay Sharma et al.

Page 1 of 1

It is certified that error appears in the above-identified patent and that said Letters Patent is hereby corrected as shown below:

In the Claims

At Claim 7, Column 23, Line 4, the phrase "bestfit" should instead read "best fit".

At Claim 11, Column 23, Line 63, the phrase "perfonuance" should instead read "performance".

At Claim 12, Column 24, Line 26, the phrase "purchasedata associatedwith the user" should instead read "purchase data associated with the user".

Signed and Sealed this
Twenty-fifth Day of July, 2023

Katherine Kelly Vidal
*Director of the United States Patent and Trademark Office*